United States Patent
Spiegel et al.

(10) Patent No.: US 8,086,546 B2
(45) Date of Patent: Dec. 27, 2011

(54) METHOD AND SYSTEM FOR ANTICIPATORY PACKAGE SHIPPING

(75) Inventors: Joel R. Spiegel, Woodinville, WA (US); Michael T. McKenna, Bellevue, WA (US); Girish S. Lakshman, Issaquah, WA (US); Paul G. Nordstrom, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1160 days.

(21) Appl. No.: 11/015,288

(22) Filed: Dec. 17, 2004

(65) Prior Publication Data
US 2006/0136237 A1 Jun. 22, 2006

(51) Int. Cl.
*G06Q 99/00* (2006.01)
(52) U.S. Cl. ........................ 705/401; 705/406
(58) Field of Classification Search ........... 705/406, 705/400, 1, 401
See application file for complete search history.

(56) References Cited

U.S. PATENT DOCUMENTS

| | | | |
|---|---|---|---|
| 6,055,520 A | 4/2000 | Heiden et al. | |
| 6,394,354 B1 | 5/2002 | Wilz et al. | |
| 6,827,273 B2 | 12/2004 | Wilz et al. | |
| 6,994,253 B2 | 2/2006 | Miller et al. | |
| 7,006,989 B2 | 2/2006 | Bezos et al. | |
| 7,130,803 B1* | 10/2006 | Couch et al. | 705/1.1 |
| 7,222,081 B1 | 5/2007 | Sone | |
| 7,664,653 B2* | 2/2010 | Dearing | 705/330 |
| 2001/0037316 A1* | 11/2001 | Shiloh | 705/74 |
| 2002/0013744 A1 | 1/2002 | Tsunenari et al. | |
| 2002/0138356 A1 | 9/2002 | Dutta et al. | |
| 2002/0165729 A1 | 11/2002 | Kuebert et al. | |
| 2003/0146138 A1 | 8/2003 | Snapp et al. | |
| 2003/0189090 A1 | 10/2003 | Holden | |
| 2004/0148217 A1* | 7/2004 | Lauring et al. | 705/10 |
| 2004/0153370 A1* | 8/2004 | Yang | 705/26 |
| 2004/0158396 A1 | 8/2004 | Im | |
| 2004/0220845 A1 | 11/2004 | Malapitan | |
| 2004/0254808 A1 | 12/2004 | Bennett et al. | |
| 2005/0075987 A1* | 4/2005 | Pintsov et al. | 705/401 |
| 2005/0197892 A1 | 9/2005 | Bilibin et al. | |
| 2005/0198165 A1* | 9/2005 | Reddel et al. | 709/206 |
| 2006/0184269 A1* | 8/2006 | Wilson et al. | 700/215 |
| 2006/0247982 A1* | 11/2006 | Stolfo et al. | 705/26 |

FOREIGN PATENT DOCUMENTS

JP 2002109263 4/2002

(Continued)

OTHER PUBLICATIONS

Danny Cohen, "Electronic Commerce," ISI Research Report, ISI/RR-89-244, Oct. 1989, 46 pages.

(Continued)

*Primary Examiner* — Akiba Robinson Boyce
(74) *Attorney, Agent, or Firm* — Robert C. Kowert; Meyertons, Hood, Kivlin, Kowert & Goetzel, P.C.

(57) ABSTRACT

A method and system for anticipatory package shipping are disclosed. According to one embodiment, a method may include packaging one or more items as a package for eventual shipment to a delivery address, selecting a destination geographical area to which to ship the package, shipping the package to the destination geographical area without completely specifying the delivery address at time of shipment, and while the package is in transit, completely specifying the delivery address for the package.

20 Claims, 11 Drawing Sheets

FOREIGN PATENT DOCUMENTS

| | | |
|---|---|---|
| JP | 2003067645 | 3/2003 |
| JP | 2004299861 | 10/2004 |
| WO | WO 2004029754 A2 * | 4/2004 |

OTHER PUBLICATIONS

"RedPrairie," RedPrairie Corporation, 2003, 2 pages.

"From Origin to Destination, The Evolution and Future of Transportation Management Systems," Manhattan Associates, 2003, pp. 1-7.

U.S. Appl. No. 11/015,290, filed Dec. 17, 2004.

U.S. Appl. No. 10/287,454, filed Nov. 4, 2006.

* cited by examiner

METHOD AND SYSTEM FOR ANTICIPATORY PACKAGE SHIPPING

BACKGROUND OF THE INVENTION

1. Field of the Invention

This invention relates to order fulfillment systems and, more particularly, to shipment of packages.

2. Description of the Related Art

The increasing scope of electronic commerce, fueled by the ubiquity of personal computers, the Internet, and the World Wide Web, has resulted in striking changes to the ways customers may shop for and purchase products. Virtual storefronts, in which customers may view product information including features, specifications, appearance, pricing and availability, have become commonplace even among wholesalers and retailers who have maintained physical customer presences (i.e., brick-and-mortar storefronts). Much commerce is already being conducted exclusively through virtual storefronts by companies lacking any other customer presence.

Electronic commerce using virtual storefronts offers many advantages, such as lower cost overhead (e.g., due to lack of sales personnel, lack of physical storefronts, highly automated ordering processes, etc.), and a potential customer base limited only by the reach of the Internet. However, one substantial disadvantage to the virtual storefront model is that in many instances, customers cannot receive their merchandise immediately upon purchase, but must instead wait for product to be shipped to them. The availability of expedited shipping methods from various common carriers may mitigate the delay in shipment, but often at substantial additional cost that may rival the price paid for the merchandise. In many instances, the lowest-cost surface-based shipping options may take a week or longer from a customer's order date. Such delays may dissuade customers from buying items from online merchants, particularly if those items are more readily available locally.

SUMMARY

Various embodiments of a method and system for anticipatory package shipping are disclosed. According to one embodiment, a method may include packaging one or more items as a package for eventual shipment to a delivery address, selecting a destination geographical area to which to ship the package, and shipping the package to the destination geographical area without completely specifying the delivery address at time of shipment. The method may further include completely specifying the delivery address for the package while the package is in transit.

According to another embodiment, a method may include determining the status of one or more shipped packages currently in transit to respective destination geographical areas, where each shipped package was shipped without completely specifying a delivery address at time of shipment. Each shipped package may include one or more items. For a given shipped package, the method may further include analyzing one or more business variables related to the item(s) included in the given package, and determining a disposition of the given package dependent upon the business variable analysis.

A system is further contemplated that in one embodiment may include a first and a second computer system. The first computer system may be configured to identify a destination geographical area to which to ship a package including one or more items that are destined for eventual shipment to a delivery address. The second computer system may be configured to communicate with the first computer system via a network. After the package has been shipped to the destination geographical area without the delivery address being completely specified at time of shipment, the first computer system may convey a complete specification of the delivery address to the second computer system. In response to receiving the complete specification of the delivery address, the second computer system may assign the delivery address to the package.

Figure 1:
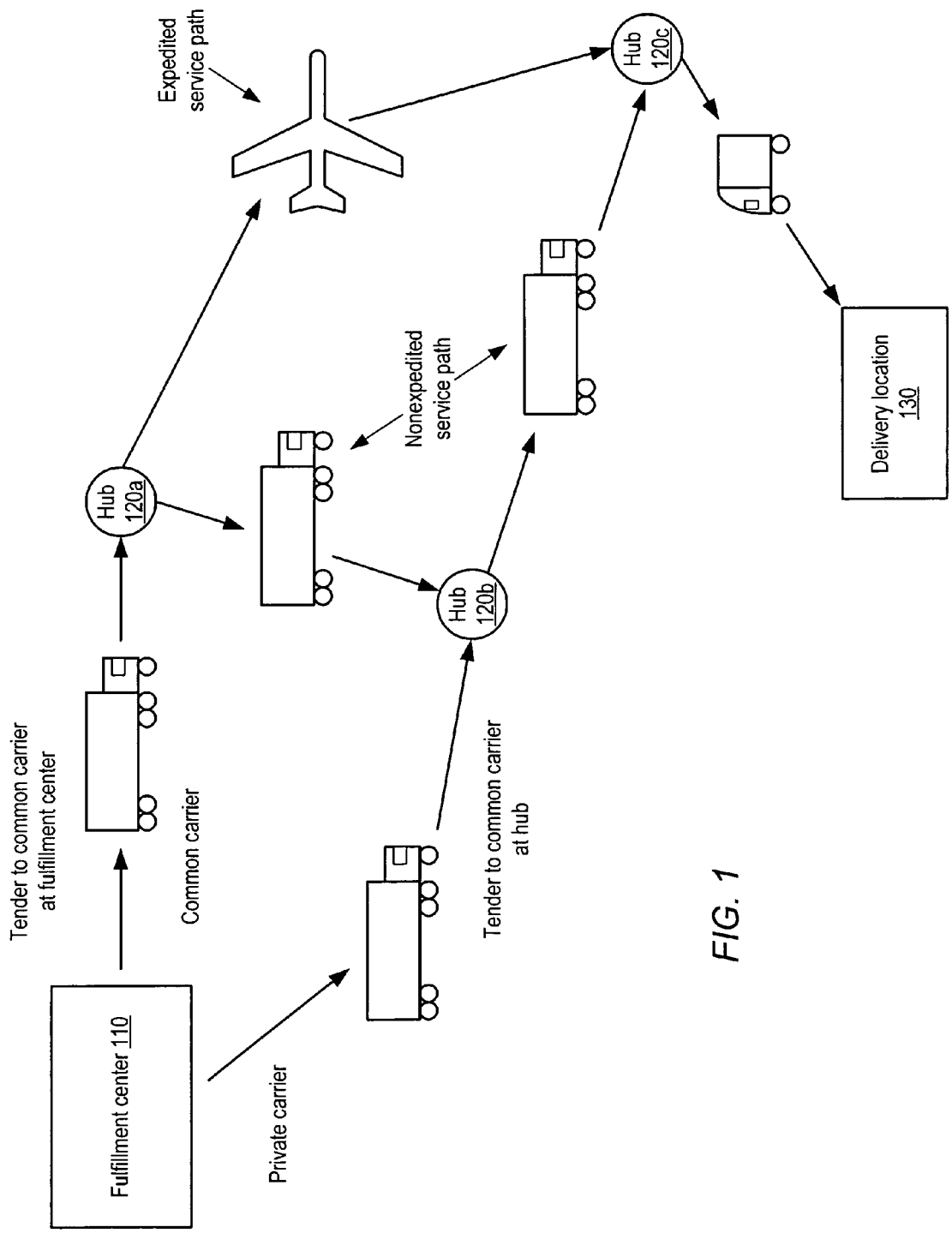
FIG. 1 is a block diagram illustrating one embodiment of a shipping network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Exemplary Shipping Network

Retailers, wholesalers, and other types of distributors often ship products to recipients, such as retail customers or other distributors. At least a portion of such shipments is frequently conducted through a common carrier. Generally speaking, a common carrier may be a business, firm or other entity that offers transportation services. Some examples of package-oriented common carriers may include United Parcel Service (UPS), FedEx, DHL and the United States Postal Service (USPS). However, common carriers may also include passenger airlines, bus lines and other types of carriers, some of which may offer package or freight transportation services in addition to personal transport.

One exemplary embodiment of a shipping network where at least a portion of product shipment is handled by a common carrier is illustrated in FIG. 1. In the illustrated embodiment, shipment of a packaged product originates at a fulfillment center 110. From fulfillment center 110, a package may be tendered to a common carrier and then transported through one or more common carrier shipping hubs 120a-c (or simply, hubs 120) in transit to a particular delivery location 130. In various embodiments, a delivery location 130 may include a particular residential or commercial location having a corresponding physical address, such as a street address or, in some cases, a post office box address. A delivery address of a package may include both a physical address identifying a delivery location and an addressee identifying an intended recipient at the delivery location. As described in greater detail below, different paths may be provided for packages between fulfillment center 110 and delivery location 130, including expedited service paths, non-expedited service paths, and downstream tendering or injection into a common carrier network via a private carrier. Also, in some embodiments, a fulfillment center 110 may tender packages to a number of different common carriers, each providing a shipping network similar to that shown.

In one embodiment, fulfillment center 110 may be configured to prepare inventory items for packaging and shipment. (It is noted that some enterprises may employ multiple fulfillment centers 110, for example geographically distributed throughout a country or the world, some or all of which may be configured similarly to the embodiment shown.) For example, inventory may be received from suppliers and stocked within fulfillment center 110. Concurrently, individual items may be selected from inventory (e.g., "picked"), packaged for shipment, and shipped. For example, in some instances one or more items may be picked from inventory in response to a customer's placing an order for those items, although as described in greater detail below, in some embodiments items may be picked, packaged and shipped before a customer has placed an order corresponding to those items. Packaging one or more picked items may in various embodiments include placing the items in a box, envelope, or other suitable shipping container, along with any necessary padding or spacer material to prevent damage to the packaged items during shipment. In some instances, certain items in inventory may be prepackaged for shipment, or the packaging in which an item arrived at fulfillment center 110 may be sufficient for shipment. A package may denote any tangible item sufficiently prepared for potential delivery to an addressee. The degree of preparation required may vary depending on the item(s) packaged, the operational requirements of the carrier, and other factors. In some embodiments, packages may have any suitable form factor, including that of standard envelopes.

In some embodiments, fulfillment center 110 may include a conventional warehouse or distribution center, in which inventory storage, picking, packaging and shipping occurs out of the same physical location. However, in other embodiments the various functions carried out at fulfillment center 110 may be distributed across several different physical locations. For example, in one embodiment of fulfillment center 110, limited inventory may be stored at a location where picking, packaging and shipping occur, and the limited inventory may be replenished (e.g., on a just-in-time basis) from a larger inventory stored elsewhere, or directly from suppliers.

Once a package enters a common carrier's shipping network (i.e., is tendered to the common carrier), it may pass through one or more hubs 120 on its way to a delivery location 130. Generally speaking, a hub 120 may include a shipping facility at which packages arrive from various locations to be sorted and distributed to other locations. In some instances, packages may arrive at a hub 120 from another hub 120. Often, a hub 120 is configured to service a particular geographical area proximal to the hub, such as a metropolitan area including all or portions of several counties, or a regional area including all or portions of one or more states. In some instances, multiple hubs 120 may service the same geographical area or overlapping areas. Packages may arrive at hub 120 from non-hub locations within the particular geographical area, such as from collection points managed by the common carrier (e.g., drop boxes, storefronts, delivery vehicles, or a tendering counter at hub 120 itself).

Packages arriving at a hub 120 from whatever source may be sorted and directed according to their respective destinations. For example, packages destined for delivery addresses within a geographical area served by a hub 120 may be sorted for local delivery within that geographical area. By contrast, packages destined for a different geographical area may be sorted to be conveyed to a different hub 120. Depending on the configuration of the common carrier's network and the destination of a given package, the given package may pass through different numbers of hubs 120 while in transit. For example, a package with a delivery address local to the hub 120 at which it is tendered may be sorted for delivery directly from that hub 120, while a package destined for a distant address may be relayed through one or more intermediate hubs 120 before arriving at a hub 120 corresponding to its destination geographical area. In some embodiments, depending on the structure of the network, it is contemplated that a package tendered for local delivery may not pass through a hub 120 at all. For example, in some embodiments, shipments within a geographical area may be made on a point-to-point or grid-type basis, while shipments into or out of that geographical area may be routed through a hub 120.

Different modes of transportation may be provided for conveying packages from their point of origin to their respective delivery addresses. In many embodiments, transportation between a package's point of origin (such as fulfillment center 110) and a hub 120, as well as transportation between a destination hub 120 and a delivery location 130, may be implemented using ground transportation, such as trucks or vans. However, at other points in transit, such as between hubs 120, packages may be transported by air, rail or ship in addition to or instead of ground transportation. In some instances, using different modes of transportation may enable a common carrier to offer different classes of service. For example, in the embodiment shown in FIG. 1, the common carrier offers an expedited service path having shorter shipping latency (e.g., overnight or two-day service) via air between hubs 120a and 120c, as well as a non-expedited service path having longer shipping latency (e.g., ground service) via truck between hubs 120a and 120c, with a stop at hub 120b. As shown in FIG. 1, in addition to using faster modes of transportation, expedited service paths may in some instances bypass hubs 120 present in the non-expedited path, reducing the number of sorts performed on the package and correspondingly reducing shipping latency of the package. (Packages may also be handled within a hub 120 according to their class of service. For example, at a given hub 120, expedited packages may be sorted before non-expedited packages.)

In some embodiments, different options may be provided for tendering packages to the common carrier. In the embodiment shown in FIG. 1, in one case packages may be tendered to the common carrier directly from fulfillment center 110.

For example, each common carrier employed by fulfillment center 110 may pick up its associated packages from fulfillment center 110, or may provide a vehicle or container into which packages may be loaded for hauling to a nearby hub 120. However, an enterprise preparing products for shipment at fulfillment center 110 may determine that it may be advantageous to privately transport some packages from fulfillment center 110 directly to one or more hubs 120 for tendering at those hubs 120. For example, an enterprise may determine there is a cost or time advantage to bypassing certain hubs 120 using a private carrier, e.g., an enterprise-owned or privately-contracted vehicle. Privately carrying a package to a common carrier hub 120 and tendering it there may also be referred to as injecting the package into the common carrier. In some embodiments, an enterprise may use a private carrier to transport packages along a route including stops at several hubs 120, injecting various packages at different hubs 120 along the route.

In-Transit Package Addressing

In conventional order fulfillment systems, an item is not shipped (or in many cases even packaged for shipment) until a customer places an order for that item to be delivered to a specific delivery address. However, in one embodiment of the system shown in FIG. 1, a package including one or more items may be shipped to a destination geographical area without completely specifying a delivery address at the time of shipment. Instead, a delivery address may be completely specified while the package is in transit. Such shipment of packages without completely specifying delivery addresses at the time of shipping may also be generically referred to as speculative shipping, and completely or partially specifying a delivery address for a package after that package has shipped (irrespective of whether the package originally was shipped with a delivery address) may be generically referred to as late-select addressing, or simply late addressing. In some embodiments, speculative shipping of a package may occur in anticipation of a customer ordering items in that package, but before such an order has actually occurred. In such embodiments, speculative shipping may also be referred to as anticipatory shipping.

For example, in one embodiment a package may be shipped from fulfillment center 110 (either by tendering the package at fulfillment center 110 or at a hub 120) with an indication of a destination geographical area, such as the geographical area serviced by a particular hub 120, but without more specific information identifying a particular delivery location 130. In various embodiments, the indication of the destination geographical area may include a particular code identifying the geographical area. For example, in one embodiment, a geographical area and its associated hub 120 may be identified by a postal code or a portion of a postal code, such as the three most significant digits of a USPS ZIP code. In other embodiments, a common carrier may use different types of codes or schemes for identifying geographical areas and associated hubs 120. It is noted that an indication of a destination geographical area may be sufficient to perform the majority of the routing of a package to a potential delivery address within the destination geographical area. For example, the indication may be sufficient to route the package to a hub 120 associated with the destination geographical area.

In some embodiments, speculatively shipping a package to a destination geographical area without completely specifying a delivery address may include specifying information other than or in addition to a postal code. For example, in one embodiment a partial street address may be specified. Alternatively, a complete street address or other physical address may be provided, but the addressee (e.g., the identified recipient of the package) may be omitted. For example, a package without addressee information may be speculatively shipped to a physical address of a residential or commercial building having a number of tenants. It is also contemplated that a package may be speculatively shipped to a particular addressee whose physical address is not known at the time of shipping. For example, an addressee may maintain multiple physical locations at which delivery may be effected, or may be moving from one location to another around the time of speculative shipment. In some embodiments, speculatively shipping a package may include predicting one of several possible physical addresses that may correspond to a particular addressee, and shipping the package to the predicted physical address. In some instances, such prediction may occur before the particular addressee has placed an order for the package contents. In various embodiments, address prediction may be performed based on historical customer shopping patterns or other forecasting factors such as described in greater detail below.

Figure 2:
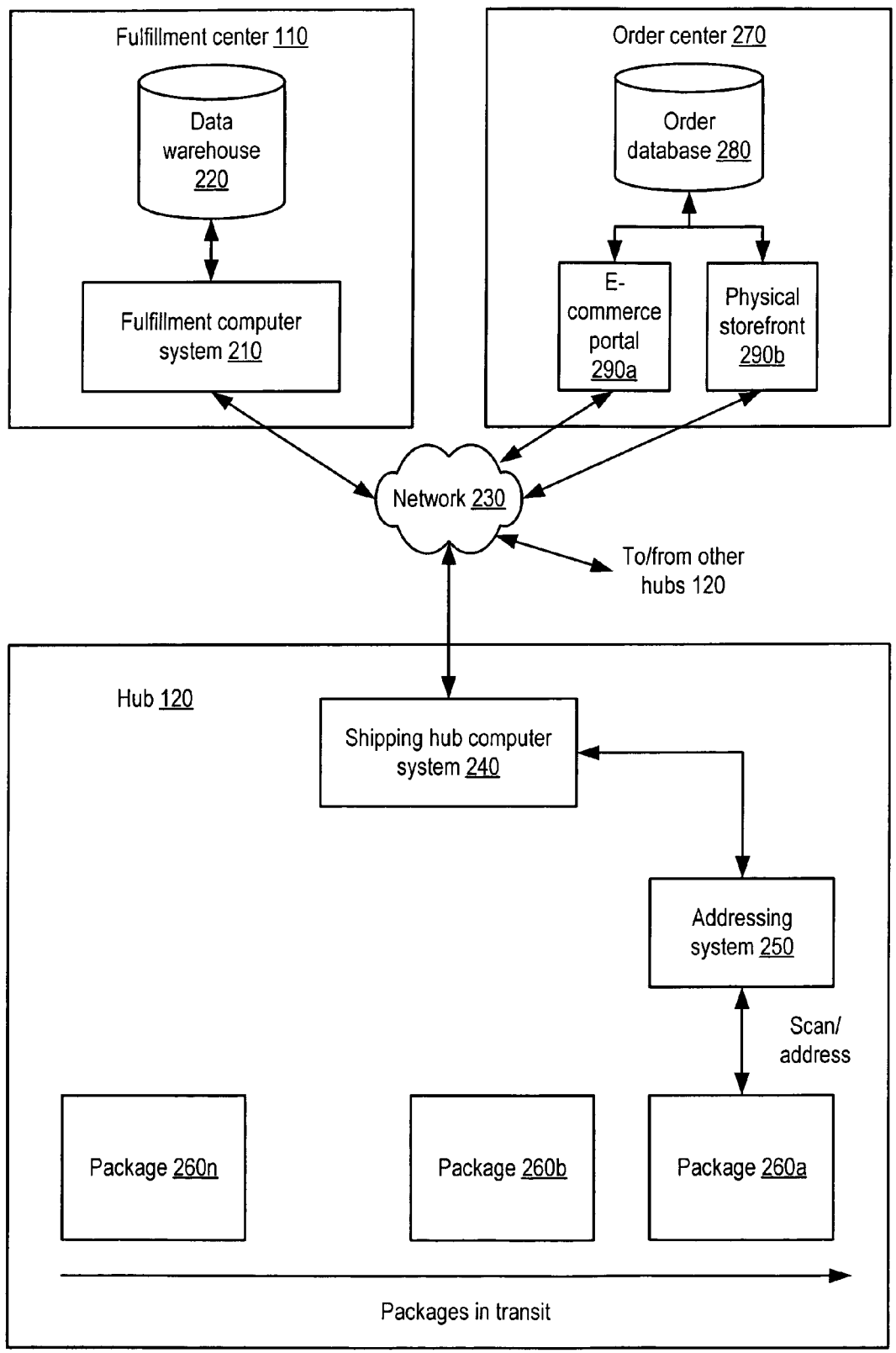
FIG. 2 is a block diagram illustrating one embodiment of a system configured to implement speculative shipping and late-select addressing.

One embodiment of a system configured to implement speculative shipping and late-select addressing is illustrated in FIG. 2. In the illustrated embodiment, fulfillment center 110 is configured to communicate with an order center 270 as well as with one or more hubs 120 via a network 230. As illustrated, fulfillment center 110 includes a fulfillment computer system 210 configured to communicate with a data warehouse 220, although in some embodiments it is contemplated that data warehouse 220 may be located externally to fulfillment center 110 (for example, fulfillment computer system 210 alternatively may be configured to interact with data warehouse 220 via network 230).

Order system 270 in the illustrated embodiment includes an order database 280 configured to interact with two possible sources of order information: an electronic commerce (e-commerce) portal 290a and a physical storefront 290b. In other embodiments, it is contemplated that more or fewer sources of order information may be included. For example, an e-commerce enterprise may lack any physical storefronts accessible to customers and may instead transact its business entirely online via a website or other type of portal. Additionally, it is contemplated that in some embodiments, the functionality of order center 270 may be partially or entirely implemented within fulfillment center 110, and in some embodiments, multiple order centers 270 may be provided. For example, order centers 270 may be geographically distributed similarly to fulfillment centers 110 as described above, either within fulfillment centers 110 or separately.

In the illustrated embodiment, hub 120 includes a shipping hub computer system 240 configured to communicate with an addressing system 250. In turn, addressing system 250 may be configured to apply an indication of a delivery address received via hub computer system 240 to any of packages 260 in transit through hub 120. It is contemplated that the illustrated embodiment of hub 120 may be illustrative of any of hubs 120 within a common carrier's shipping network, although not every hub 120 need be so configured.

As packages are shipped from fulfillment center 110, in the illustrated embodiment information about those packages may be captured by fulfillment computer system 210 and stored by data warehouse 220. In one embodiment, data warehouse 220 may include a database or other data repository configured to store such captured data. However, in some embodiments, data warehouse 220 may also be configured to aggregate data stored in one or more data sources, such as databases or other applications within the enterprise. For example, data warehouse 220 may be configured to aggregate order records stored by order database 280, or various shipping or inventory records from other fulfillment centers 110 within an enterprise. In some instances, aggregation of data gathered from different functional or geographical units within an enterprise may facilitate analysis of complex or systemic behavior patterns within the enterprise, as described in greater detail below. It is noted that in some embodiments of fulfillment center 110, many activities in addition to package shipping may be tracked by fulfillment computer system 210 and stored by data warehouse 220. For example, items may be tracked as they arrive at fulfillment center 110 from suppliers, are placed into inventory, and are picked for packaging and shipment.

In some embodiments, individual inventory items and/or packages may be identified and tracked using bar codes, magnetically or optically-readable characters, or other types of marking and scanning techniques. In such embodiments, codes may tracked by scanning devices or manually entered by personnel at various points in the fulfillment process. Alternatively, individual items and/or packages may be identified using radio techniques, such as by affixing radio frequency identifier (RFID) tags or other types of transponders to items to be tracked. Each of the foregoing techniques for marking or identifying an item or package may be generically referred to as a machine-readable identifier. It is contemplated that any suitable type of machine-readable identifier may be employed, whether or not the identifier is also readily human-readable. In some embodiments, for example, compounds having unique and readily detectable optical or chemical properties may also be used in various combinations to identify items or packages.

As packages, such as packages 260, are speculatively shipped to various destination geographical areas from fulfillment center 110, data regarding such packages 260 may be stored within data warehouse 220. For example, a unique identifier (such as a bar code or radio transponder as described above) may be associated with each package 260 prior to shipment, and a corresponding record of the unique identifier stored as a record within data warehouse 220. A record of the specific item or items included in a given package 260 may also be stored within data warehouse 220, as may current and historical tracking information of given package 260 such as may be provided by the common carrier. It is noted that in some embodiments, unique identifiers need not be associated with individual packages. For example, in one embodiment fulfillment center 110 may individually package a number of identical items for speculative shipment (such as a newly released novel or other item) and may tender a lot of such packaged items to a common carrier to be speculatively shipped to a destination geographical area. In such an embodiment, the location and/or identity of the lot may be tracked, but the individual packages within the lot may be interchangeably selected for late-select addressing without respect to unique identifiers. Also, in some embodiments, an indication of the type or class of the item or items within a given package 260 may be associated with the given package 260 in addition to a unique identifier. For example, a given item may be associated with an identifier that is unique to that type, class or model of item (but not necessarily unique to a specific instance of the item) such as an International Standard Book Number (ISBN), a Stock Keeping Unit (SKU), a Universal Product Code (UPC), or a proprietary, vendor-specific identifier. Such an indication may be applied to a package 260 in a manner similar to a unique identifier of package 260, or may be associated with a package unique identifier, e.g., as part of a database record.

Some time after a given package 260 is speculatively shipped, a customer may place an order for the one or more items included in given package 260, which order may include a specific delivery address within a particular geographical area. For example, a customer may place an order online via e-commerce portal 290a, or in person at physical storefront 290b. (In other embodiments, the order may be placed on behalf of a customer either online or at a physical storefront, such as by a telephone representative or a salesperson.) A record of the order may be stored in order database 280. In response to the order being placed, the order may also be transmitted to one or more fulfillment centers 110 via network 230. Fulfillment computer system 210 may then query data warehouse 220 to determine whether a speculatively shipped package 260 that is currently in transit partially or completely satisfies the requirements of the order. If no package 260 in transit satisfies the order (or if the order specifies that all items be shipped together, disqualifying partial packages 260 in transit), the order may be fulfilled through the ordinary fulfillment process (e.g., inventory may be picked, packaged and shipped to the delivery address provided by the customer).

However, fulfillment computer system 210 may determine that one or more speculatively shipped packages 260 in transit satisfy the received order, and may then determine the current locations and destination geographical areas of the package or packages 260, for example by referencing tracking data stored in data warehouse 220, or by performing a real-time tracking inquiry to the common carrier(s) conveying the packages 260. If more than one package 260 satisfies the received order, fulfillment computer system 210 may be configured to select one for late addressing on any suitable basis. For example, a package 260 closest to the delivery address of the order (e.g., at or en route to a hub 120 closest to the geographical area including the delivery address) may be selected. However, it is contemplated that more sophisticated selection algorithms may also be employed that may take into account various order parameters and the possibility of multiple outstanding orders satisfiable by in-transit packages 260. For example, if one package 260 is closest to a geographical area from which two orders satisfiable by the package 260 have been placed, an order specifying expedited shipping may take precedence over an order specifying a non-expedited class of shipping in the selection algorithm.

Once a speculatively shipped package 260 has been selected for a corresponding order, fulfillment computer system 210 may be configured to convey a complete specification of the delivery address specified by the order to the hub 120 at which the selected package 260 is currently located or to which it is en route. For example, fulfillment computer system 210 may convey the delivery address to shipping hub computer system 240 via network 230. In some embodiments, fulfillment computer system 210 may convey the delivery address along with information corresponding to a unique identifier assigned to the selected package 260 (e.g., information about a bar code or radio tag associated with the package).

In response to receiving the completely specified delivery address, in the illustrated embodiment shipping hub computer system 240 may be configured to assign the specified delivery address to the selected package 260. For example, in one embodiment, as various packages 260 pass through hub 120, their associated bar codes or radio tags may be scanned, and unique identifier information associated with the various packages 260 may be compared with unique identifier information received from fulfillment computer system 210. When unique identifier information associated with selected package 260 is detected, shipping hub computer system 240 may assign the completely specified delivery address to selected package 260. It is contemplated that in some embodiments, shipping hub computer system 240 may be configured to provide various package status information to fulfillment computer system 210. For example, shipping hub computer system 240 may provide information identifying those packages at a hub 120 that have been assigned or not yet assigned completely specified delivery addresses.

In some embodiments, assigning a delivery address to a package 260 may include applying an indication of the delivery address to that package 260. In the illustrated embodiment, hub 120 includes addressing system 250, which may be configured to perform such address application. In one embodiment, addressing system 250 may be configured to print a label including the delivery address, which may then be automatically or manually affixed to the selected package 260. Alternatively, addressing system 250 may be configured to directly apply the delivery address to the selected package 260, for example by using an inkjet printhead. In some embodiments, it is contemplated that scanning functionality may be built into addressing system 250, such that it may scan a package 260, convey unique identifier information to shipping hub computer system 240, and apply a delivery address if a delivery address is to be assigned to the package 260. In other embodiments, it is contemplated that a device distinct from addressing system 250 may be used for such scanning. For example, in one embodiment packages 260 being sorted in hub 120 may pass along a conveyor belt or similar transport mechanism, and may pass a scanning device and addressing system 250 in turn.

How the location of a package 260 is determined may vary in various embodiments. In some embodiments, a package 260 may be considered to be located at a given hub 120 until it physically leaves that hub 120, while in other embodiments, it may be located at a given hub 120 until the last tracking scan and/or the last opportunity to apply a late-selected address has transpired. These location criteria may vary at different hubs 120 in some embodiments, and fulfillment computer system 210 may be configured to take location criteria into account when determining location of packages 260 for late-addressing selection. It is contemplated that in some embodiments, assignment of a delivery address to a package 260 may occur at one hub 120, while application of the delivery address to that package 260 may occur at another hub 120. For example, address assignment may occur after the last opportunity to apply the address has transpired at a given hub 120, but the assignment may still be reflected within shipping hub computer system 240, which may coordinate address application with a downstream hub 120.

It is noted that in some embodiments, assignment of a late-selected delivery address to a speculatively shipped package 260 need not take place at a hub, but may instead occur during the "last mile" of delivery (e.g., during transit of a package 260 on a local delivery route). Further, such address assignment need not require application of an indication of the delivery address to the package 260. In some embodiments, a package 260 may be speculatively shipped to a destination geographical area that is sufficiently specific to allow the package 260 to be sorted and placed on a specific delivery route after reaching a hub 120 associated with the destination geographical area (e.g., a package 260 may be speculatively shipped to a five-digit USPS ZIP code associated with a particular common carrier delivery route). Alternatively, a package 260 may be speculatively shipped to a shipped to a broader geographical area (e.g., a three-digit USPS ZIP code), and more specific destination information (e.g., a five-digit USPS ZIP code) may be supplied in transit without necessarily completely specifying the delivery address at the time package 260 is placed on a specific delivery route. Once a speculatively shipped package 260 leaves a hub 120 on a local delivery route, a complete delivery address may be specified in transit, for example by transmitting the delivery address from hub 120 to a delivery vehicle using radio, satellite, cellular phone, cellular text messaging or another suitable communication technology. For example, a delivery vehicle driver may be instructed to deliver a speculatively shipped package 260 having a particular unique identifier to a delivery address received while in transit. The delivery address may be indicated to the driver via a communications device and need not be applied to the package 260, although in some embodiments a label or other delivery address indication may be applied prior to delivery.

Additionally, it is contemplated that in some embodiments, assignment of a late-selected delivery address to a speculatively shipped package 260 may occur before that package 260 has been tendered to a common carrier. For example, as described above, some speculatively shipped packages 260 may leave fulfillment center 110 via a private carrier, such as a leased vehicle, which may be destined for one or more hubs 120. In one such embodiment, a private carrier vehicle may include a system similar to addressing system 250 that may be configured to communicate with fulfillment computer system 210, for example via a wireless or satellite-based data network, to receive an address to be assigned to a particular speculatively shipped package 260 before that package is tendered at a particular hub 120. For example, a label or other machine-readable identifier indicative of a delivery address may be applied or assigned to a given package 260 while it is in transit from fulfillment center 110 to a particular hub 120.

It is noted that while in some embodiments, assignment of an address to a speculatively shipped package 260 may include application of an indication of the assigned address to the package 260, in other embodiments assignment may be performed entirely virtually. For example, a bar code, RFID tag, or other machine-readable unique identifier associated with the package 260 may be dynamically associated with a particular delivery address by fulfillment computer system 210, such that when the package 260 is scanned (e.g., at a hub 120, or while on a delivery vehicle) the particular delivery address may be retrieved. In such embodiments, the overhead associated with applying an indication of the delivery address in addition to a unique identifier may be reduced, particularly in instances where the package 260 may be redirected from its original destination geographical area.

Once a package 260 is speculatively shipped to a destination geographical area from fulfillment center 110, in some embodiments that package 260 need not ultimately be delivered to a delivery address within that destination geographical area. In one embodiment, fulfillment computer system 210 may be configured to redirect a speculatively shipped package 260 to a different geographical area either before or after an order has been placed corresponding to the package 260. For example, fulfillment computer system 210 may determine that a speculatively shipped package 260 that satisfies a customer's order is already in transit to a geographical area other than the one corresponding to the customer's delivery address. Alternatively, fulfillment computer system 210 may speculatively redirect packages 260 in transit, for example to balance the distribution of speculatively shipped packages 260 throughout the common carrier's network. In some instances, redirection may include returning the package 260 to fulfillment center 110, for example if no corresponding order has been placed after a certain amount of time in transit.

Package redirection may be accomplished similarly to late-select addressing described above, except that in the case of a package 260 being speculatively redirected (i.e., redirected prior to being selected for a corresponding order), fulfillment computer system 210 may be configured to convey to shipping hub computer system 240 an indication of the new destination geographical area rather than a completely specified delivery address. For example, in one embodiment fulfillment computer system 210 may convey the first three digits of the ZIP code corresponding to the new destination geographical area.

Figure 3:
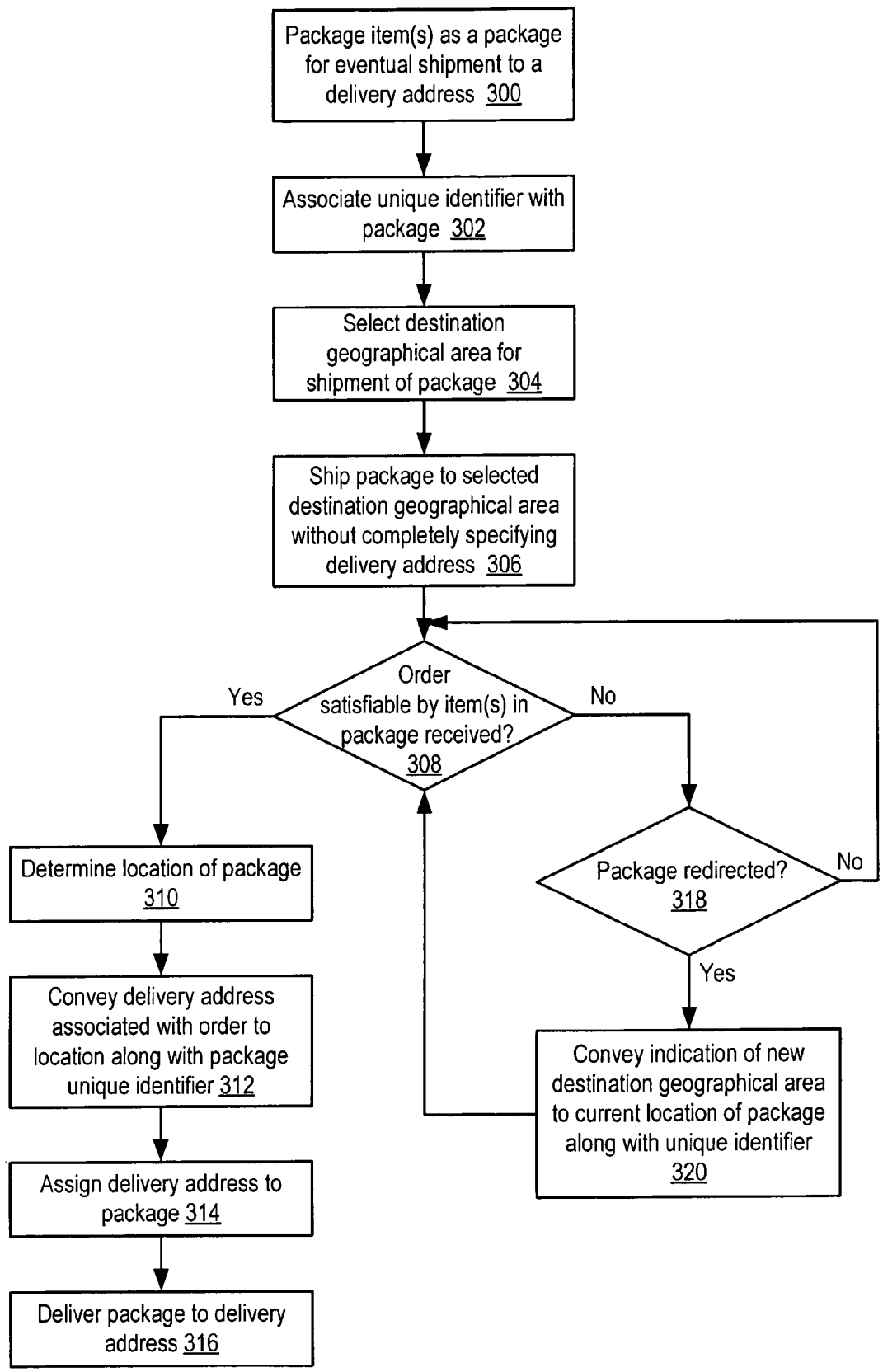
FIG. 3 is a flow diagram illustrating one embodiment of a method of speculative package shipping with late address selection.

A flow chart illustrating the operation of one embodiment of a method of speculative package shipping with late address selection is shown in FIG. 3. Referring collectively to FIG. 1 through FIG. 3, operation begins in block 300 where one or more items are packaged as a package 260 for eventual shipment to a delivery address. For example, inventory items may be packaged to meet a particular common carrier's requirements for shipment, as distinct from bare inventory that does not meet those requirements. A unique identifier, such as a unique bar code or radio tag, is then associated with package 260 (block 302).

A destination geographical area to which to ship package 260 is then selected, for example dependent upon predicted demand for the items in package 260 as described in greater detail below (block 304). Package 260 is then shipped to the selected destination geographical area without completely specifying a delivery address (block 306). For example, package 260 may be shipped with only a postal code or a portion of a postal code corresponding to the destination geographical area.

While package 260 is in transit, an order satisfiable by the items included in package 260 and specifying a complete delivery address may be received (block 308). If such an order is received, the location of package 260 is determined (block 310) and the completely specified delivery address and unique identifier corresponding to package 260 are conveyed to a hub 120 corresponding to the determined location (block 312). For example, tracking information may be consulted to determine that package 260 is at or in transit to a particular hub 120.

In response to hub 120 receiving the completely specified delivery address, the delivery address is assigned to package 260 (block 314). For example, the unique identifier associated with package 260 may be detected, and the corresponding delivery address assigned in response to the detection. In some embodiments, assigning the delivery address may include applying an indication of the delivery address to package 260. Subsequently, package 260 is delivered to the assigned delivery address (block 316).

If no order corresponding to package 260 is received in block 308, package 260 may be redirected (block 318). For example, fulfillment computer system 210 may determine that package 260 should be directed to a different destination geographical area, or returned to fulfillment center 110. If package 260 is redirected, an indication of the new destination geographical area is conveyed to the current location of package 260 (block 320) in a manner similar to the conveying of a delivery address in blocks 310-314. Operation may then proceed from block 308 where an order corresponding to redirected package 260 may be detected. If package 260 is not redirected, it continues in transit to the originally selected destination geographical area, and operation may proceed from block 308.

Figure 4A:
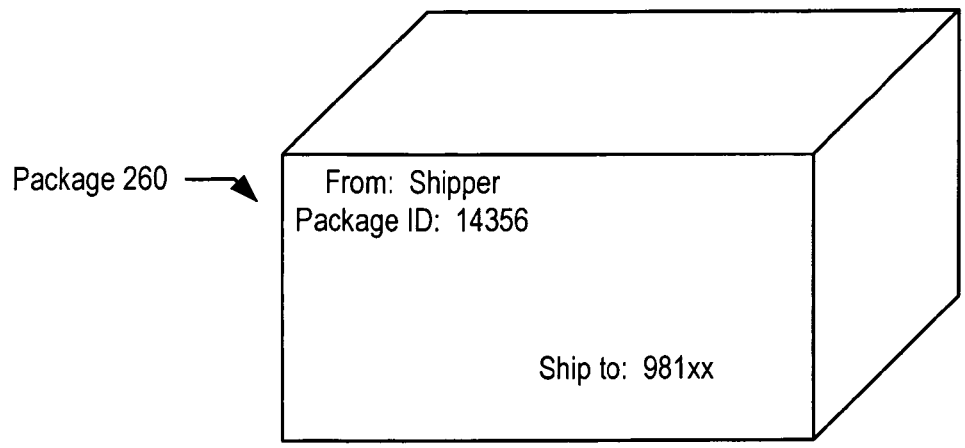
FIG. 4A-C are block diagrams illustrating various addressing scenarios for an exemplary speculatively shipped package.
Figure 4B:
Figure 4C:
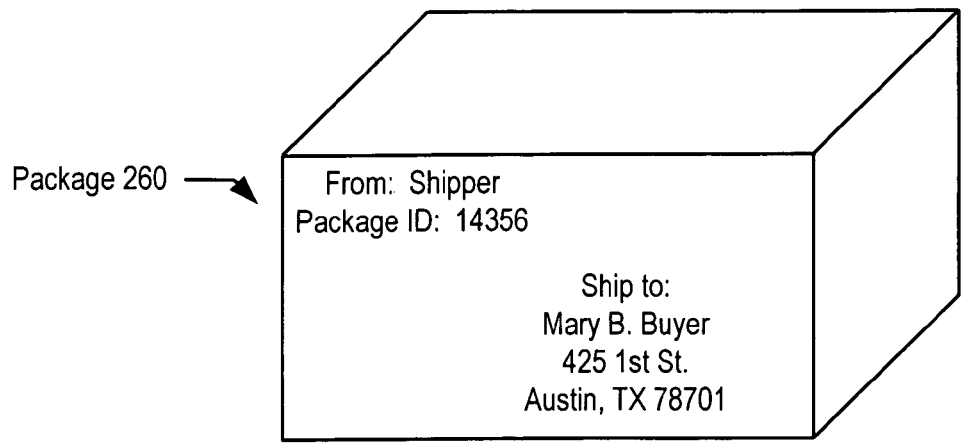

Various addressing scenarios for an exemplary speculatively shipped package 260 are shown in FIG. 4A-C. In FIG. 4A, a package 260 that has been speculatively shipped is shown before it has been associated with a particular customer order. In the illustrated embodiment, package 260 includes a unique package identifier numerically given as 14346, though this identifier could be implemented in any suitable technology as described above. As shown, package 260 has been speculatively shipped to a geographical area defined by the three most significant USPS ZIP code digits 981, which correspond to the Seattle area (though any other geographical area may be specified).

FIGS. 4B-C illustrate two possible late-address selection scenarios for the package speculatively shipped as shown in FIG. 4A. In the case of FIG. 4B, subsequent to speculative shipment of package 260, an order from a customer was received that was satisfiable by the items included in package 260. The delivery address specified by the order was a Seattle address, and while package 260 was in transit to the Seattle geographical area, the delivery address was applied to package 260 at a location (e.g., a hub 120) in between the origin of the package (e.g., fulfillment center 110) and the delivery address, as described above in conjunction with the descriptions of FIG. 2 and FIG. 3.

Like FIG. 4B, in the case of FIG. 4C, subsequent to speculative shipment of package 260, an order from a customer was received that was satisfiable by the items included in package 260. However, in this instance the order specified an Austin delivery address in a different geographical area identified by the three most significant USPS ZIP code digits 787. Thus, while package 260 was in transit to the 981xx geographical area, it was redirected to the 787xx geographical area (which may have occurred either before or after receipt of the corresponding order, as previously described), with the delivery address within the new geographical area being applied in transit as described above.

Modeling Shipping Network Behavior and Analyzing Shipping-Related Business Variables Speculative shipping and late-select addressing may allow for increased flexibility in shipping, as complete delivery information is not required before speculative shipment of a package occurs. In some embodiments, speculative shipping and late-select address may be combined with other techniques, such as predictive modeling of a common carrier's shipping network behavior and forecasting of customer demand for various products. Such combinations may result in opportunities for cost savings, improved customer buying experiences, improved inventory management, and/or other aspects of fulfillment operations, as described in greater detail below.

In some embodiments, a predictive shipping model may be employed in conjunction with speculative package shipping. Generally speaking, a predictive shipping model (or simply, a shipping model) may include a computational model of a common carrier's shipping network that may be configured to predict one or more shipping-related outcomes given one or more input constraints. In one embodiment, a shipping model may be configured to predict a latency (i.e., a duration of transit) to a given destination for a given package 260 currently at a given location (e.g., a fulfillment center 110 or other origination location, or a hub 120 or other in-transit location). A destination may be a completely specified delivery address, but in some embodiments a predictive shipping model may support latency predictions for multiple degrees of granularity of destinations (e.g., broad geographical regions, specific geographical areas, delivery zones/routes within geographical areas, street addresses, etc.). Additionally, in some embodiments a predictive shipping model may predict shipping outcomes in addition to or other than latency.

For example, a shipping model may be configured to predict a route (such as a sequence of hubs 120) that will be traversed by a given package 260.

In some instances, a shipping model may be derived from operational parameters specified by a common carrier. For example, a common carrier may specify operational goals for how long it expects a package 260 to be in transit to various destinations, and may publish common routes for packages 260 traversing various regions. However, such goals and routes may not accurately reflect the true behavior of the shipping network, particularly with respect to specific points of origination and specific destinations. For example, latencies for shipping from a particular geographical area may vary depending on the point within the region a package 260 is tendered (e.g., at a hub 120, from a fulfillment center 110, or from another location).

Figure 5:
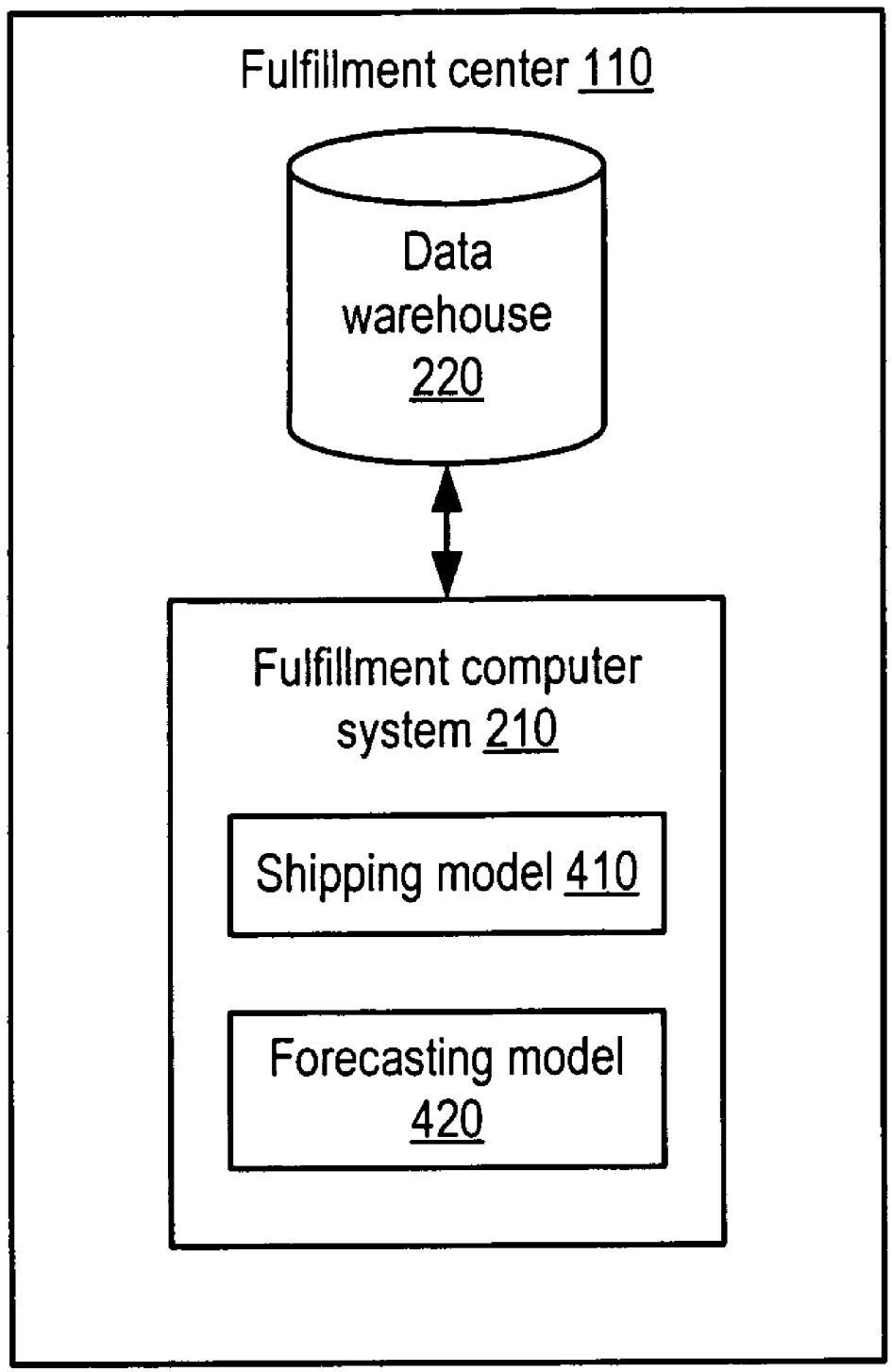
FIG. 5 is a block diagram illustrating one embodiment of a fulfillment computer system configured to host a shipping model and a forecasting model.

One alternative to constructing a shipping model based on statements of expected behavior is to generate a shipping model based on observed shipping behavior. For example, many common carriers expose real-time shipment tracking data for packages 260 in transit in their networks. In one embodiment, fulfillment computer system 210 may be configured to gather historical shipment tracking data for each of a number of packages 260 in transit. For example, the actual latency incurred by a specific package 260 shipped to a specific destination (either speculatively or non-speculatively) from fulfillment center 110 may be captured, as well as information identifying the route taken by a package 260 (e.g., the hubs 120 through which package 260 passed). Such historical tracking data may be stored in data warehouse 220, which in some embodiments may also store tracking data for shipments from other fulfillment centers 110. Subsequently, a modeling tool or application may process stored tracking information to discern relationships and trends among the data, for example by comparing and averaging latencies for packages 260 having common destinations, by analyzing the paths traversed by various packages 260 while in transit, etc. FIG. 5 illustrates fulfillment computer system 210 hosting a shipping model 410 as well as a forecasting model 420 (described below), although it is contemplated that in other embodiments, a different computer system may host these models, including a system external to fulfillment center 110.

In some embodiments, curve-fitting techniques may be applied to the tracking data to extract analytic relationships (e.g., equations) from the data, which may in turn yield a static "black box" shipping model that may be evaluated without reference to its source data. In other embodiments the historical shipping data may be dynamically mined for relationships in real time or near-real time, and the collection of data in combination with the analysis/mining tool may be included in the shipping model 410. Other model generation and implementation techniques are possible and contemplated. Depending on the sophistication and frequency of the data analysis, a resulting model may detect changes or transient conditions within the shipping network, such as congestion points, route reconfiguration, etc. Additionally, in some embodiments, shipping model 410 may include algorithms configured to predict relationships, such as latencies for various source/destination pairs, in the absence of specific historical data for those relationships. For example, shipping model 410 may be configured to estimate a latency for an unknown source/destination pair using the closest known endpoints in conjunction with an estimating factor.

Shipping model 410 may be used to identify the proximity of a given, speculatively shipped package 260 to a destination such as a particular delivery address. For example, fulfillment center 110 may speculatively ship a number of packages 260 including various items or combinations of items to a variety of destination geographical areas, such that at any given time, a number of packages 260 are in transit and available to fulfill a potential customer order to a particular delivery address. Which package 260 should be associated with a customer order or offered to a customer to induce an order may depend on a number of factors including package proximity as identified by shipping model 410. In one embodiment, shipping model 410 may be configured to identify proximity of a given package 260 to a particular delivery address by estimating the latency to the particular delivery address from a current location of given package 260. In other embodiments, shipping model 410 may be configured to identify proximity using factors other than latency, such as geographical distance to the particular delivery address from the current location of a package 260, the number of "hops" (e.g., hubs 120) along the expected route of a package 260, or the expected cost of shipment from the current location to the delivery address. However, it is noted that in some instances, two locations that are geographically proximate may not be temporally proximate, depending on the structure of the shipping network. For example, two towns may be adjacent and yet lie within two different geographical areas, such that a delivery from one town to the other may travel through the hubs 120 of each geographical area, incurring a delay disproportionate to the distance between origin and destination. In some embodiments, shipping model 410 may be configured to take such disparities into account, for example by accounting for the actual routes available to deliver a package 260 to a given delivery address.

Figure 6:
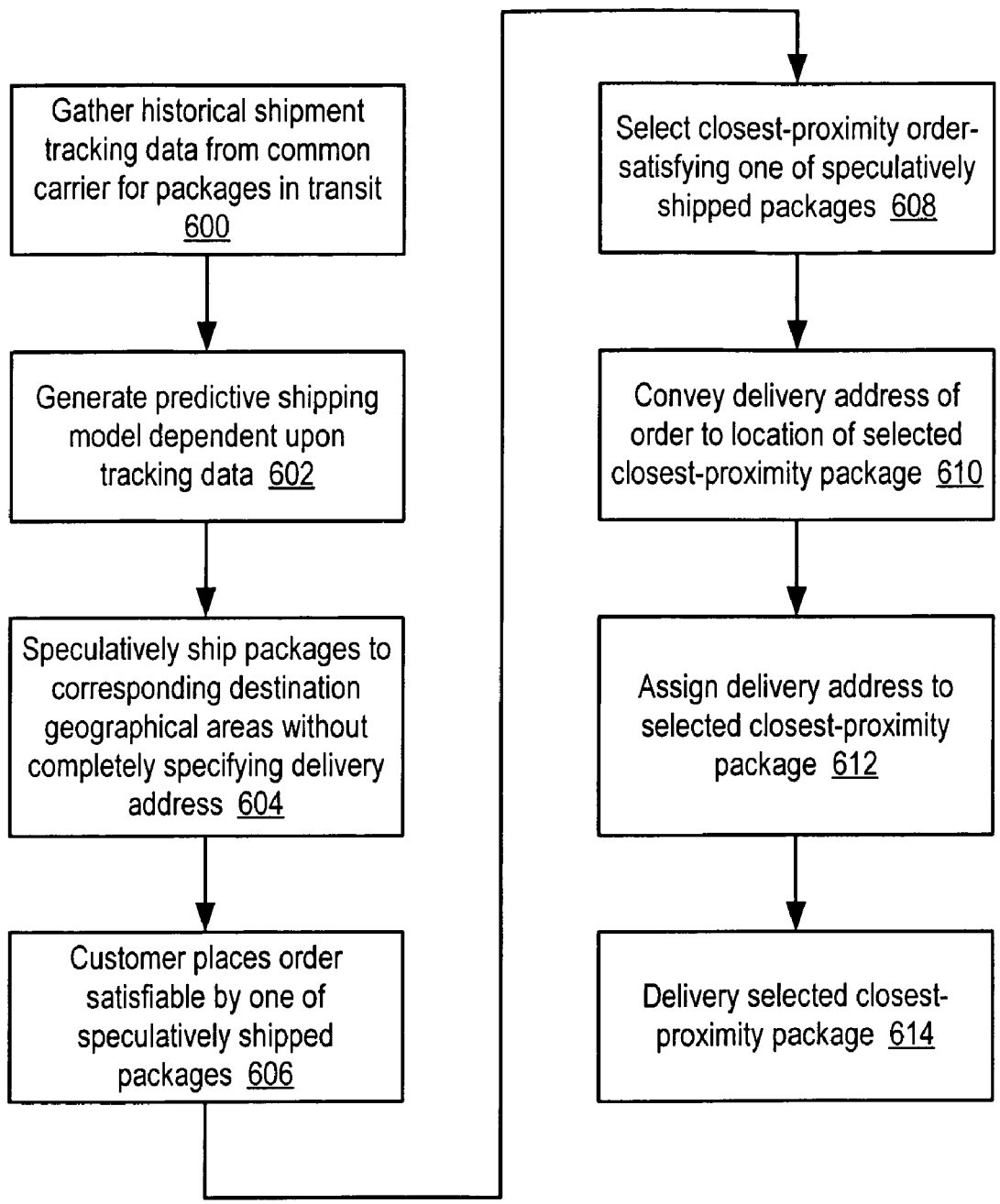
FIG. 6 is a flow diagram illustrating one embodiment of a method of selecting a closest-proximity speculatively shipped package to fulfill a customer order.

One embodiment of a method of selecting a closest-proximity speculatively shipped package to fulfill a customer order is illustrated in FIG. 6. Referring collectively to FIGS. 1-6, operation begins in block 600 where historical shipment tracking data is gathered from a common carrier for a number of packages 260 in transit. For example, fulfillment computer system 210 may be configured to collect such tracking data using an web services interface to a common carrier. Subsequently, a predictive shipping model 410 is generated dependent on the gathered historical shipment tracking data (block 602). As described above, such a shipping model 410 may be a static or dynamic model in various embodiments.

Prior to a customer placing a corresponding order, each of a number of packages 260 including one or more items is then speculatively shipped to a corresponding destination geographical area without a completely specified delivery address (block 604). A customer then places an order with a particular delivery address, which order is satisfiable by one of speculatively shipped packages 260 (block 606). In response to the customer order, a closest-proximity one of the order-satisfying speculatively shipped packages 260 to the particular delivery address is selected (block 608). For example, in one embodiment, fulfillment computer system 210 may be configured to identify the current locations of all in-transit speculatively shipped packages 260 that satisfy the order. Then, shipping model 410 may be configured to rank the proximity (e.g., by shipping latency) of all the qualifying packages 260 with respect to the particular delivery address, and to choose the closest-proximity package 260. In some embodiments, it is contemplated that a given speculatively shipped package 260 may be selected as a closest-proximity package for a particular order before the given package 260 has reached its original destination geographical area. For example, while in transit to a hub 120 associated with its specified destination geographical area, a speculatively shipped package 260 may pass through, or be predicted to pass through, another hub 120 corresponding to a geographical area from which a customer order was received. Depending on the other packages 260 within the shipping network, the parameters of the customer order, or any other relevant factors, the package 260 in question may be diverted from its original destination to satisfy the customer order.

Once a closest-proximity package 260 is selected, the particular delivery address is conveyed to the location of the closest-proximity package 260 (block 610). For example, fulfillment computer system 210 may convey the delivery address to shipping hub computer system 240 at a particular hub 120. In some embodiments, the closest-proximity package 260 may already be on a local delivery route within a geographical area, in which case the particular delivery address may be conveyed to the vehicle transporting the closest-proximity package 260. Subsequently, the particular delivery address is assigned to the closest-proximity package 260 (block 612). In some embodiments, address assignment may include applying the delivery address to the package, for example using a label or directly printing the address on the package, while in other embodiments address assignment may be entirely virtual. The closest-proximity package 260 is then delivered to the particular delivery address (block 614).

It is noted that in some embodiments, some or all of speculatively shipped packages 260 may be shipped using a non-expedited class of service, such as ground service, which may generally incur a longer overall shipping latency (and generally a lower cost) than an expedited class of service. However, at a given time, at least one of speculatively shipped packages 260 may be available for delivery to a particular delivery address with a latency corresponding to an expedited class of service. That is, at a given time, numerous speculatively shipped packages 260 may be propagating through a shipping network. When an order is placed, a closest-proximity package 260 may already be at or close to a hub 120 closest to the delivery address of the order, and thus may be available within, e.g., a day of the order placement. Consequently, the order may be fulfilled by the closest-proximity package 260 as if the order had specified expedited shipping, even though the closest-proximity package 260 may have originally been tendered for non-expedited shipment days prior to the order. Thus, in some embodiments, speculative shipment may be combined with a shipping model 410 to facilitate emulation of higher-cost expedited shipping using lower-cost non-expedited shipping.

Selection of a closest-proximity speculatively shipped package 260 need not be limited to the case where a customer places an order corresponding to the item(s) in the package 260. In some embodiments, information about package availability may be determined before a customer places an order and presented to the customer during the shopping process. For example, in one embodiment a customer may interact with e-commerce portal 290a to view various web pages including information on items of interest. While the customer is browsing, e.g., when the customer navigates to a web page corresponding to a particular item, e-commerce portal 290a may be configured to communicate with fulfillment computer system 210 to determine what speculatively shipped packages 260 are in transit that include the particular item. Fulfillment computer system 210 may then query tracking information to locate the appropriate packages 260, and may consult shipping model 410 to ascertain the proximity of those packages 260 to the customer. Finally, e-commerce portal 290a may be configured to notify the customer (for example, in the web page the customer is viewing) as to the shipping availability of the item given the shipping model information. In some instances, e-commerce portal 290a may offer the item to the customer for the cost of non-expedited shipping, even though the item may be available with considerably less latency than if the item had been shipped from fulfillment center 110 after the customer had placed an order. Alternatively, e-commerce portal 290a may pursue another cost strategy with respect to the item, for example by offering to discount shipping charges relative to the cost of expedited shipping, or any other suitable strategy.

More sophisticated pre-order integration of package proximity information with the customer order process is possible. In one embodiment, a speculatively shipped package 260 may reach its destination geographical area before any corresponding customer order occurs. Depending on the common carrier, such a package 260 may be returned to its point of origin by the common carrier within a certain period of time if no corresponding delivery address is provided. Alternatively, such a package 260 may be redirected to a different geographical area in response to actual or forecasted customer demand in that area. However, either case may incur additional shipping costs by the common carrier.

Figure 7:
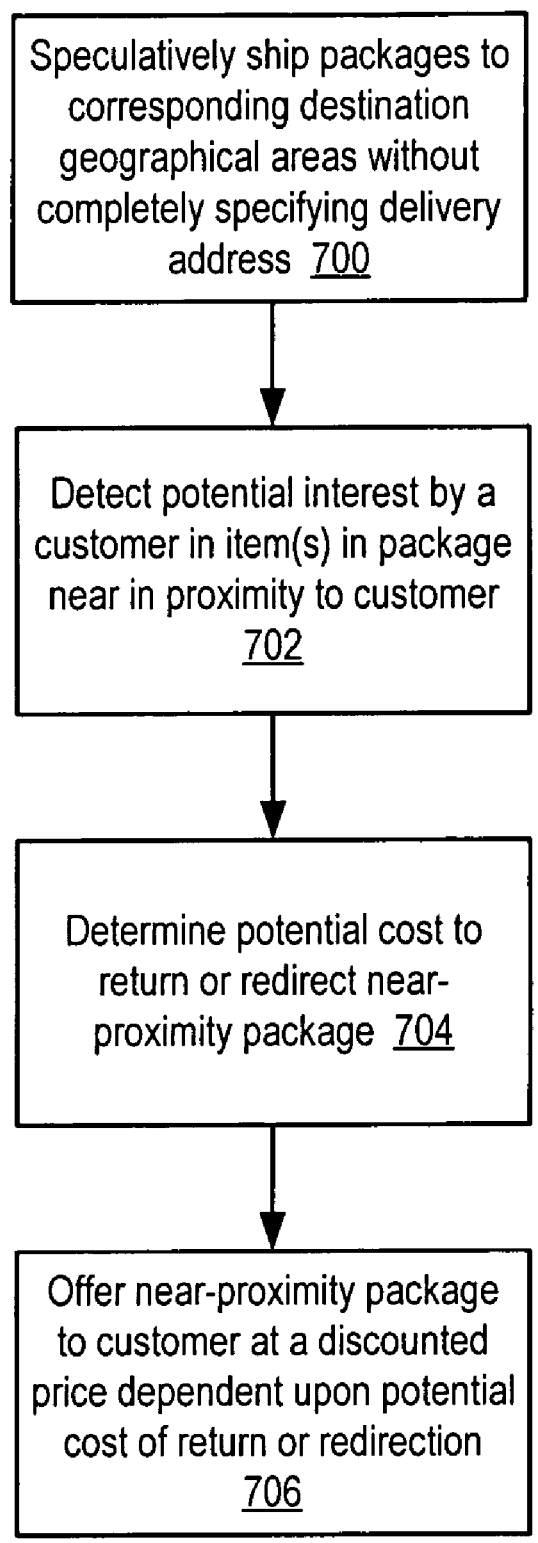
FIG. 7 is a flow diagram illustrating one embodiment of a method of reducing returns and/or redirection of speculatively shipped packages.

One embodiment of a method of reducing returns and/or redirection of speculatively shipped packages 260 is illustrated in FIG. 7. Referring collectively to FIGS. 1-7, operation begins in block 700 where each of a number of packages 260 including one or more items are speculatively shipped to a corresponding destination geographical area, for example as described previously. While packages 260 are in transit, potential interest by a customer in the item(s) of a package 260 near in proximity to that customer is detected (block 702). In one embodiment, detecting a customer's potential interest in a particular item may include analyzing the customer's historical buying patterns, for example by analyzing items a customer has bought or browsed via e-commerce portal 290a and ascertaining the relatedness of the particular item to items reflected in the customer's buying patterns. Customer interest may also be detected by analyzing preferences explicitly expressed by the customer, for example through surveys or questionnaires, by analyzing the customer's demographic information, or any other suitable source of information. In some embodiments, interest determination may be confined to those packages 260 in closest proximity to the customer, while in other embodiments packages 260 with different degrees of proximity may be considered.

Once customer interest in the item or items included in a near-proximity package 260 is detected, a potential cost to return or redirect the near-proximity package 260 is determined (block 704). For example, the potential cost of returning or redirecting may depend on whether the near-proximity package 260 has reached its destination geographical area, how much time remains until the carrier requires that the package be returned or redirected, or any other factor that may affect the actual cost of returning or redirecting the package. In one embodiment, fulfillment computer system 210 may be configured to determine this potential cost using shipping model 410 and information about the current status of speculatively shipped packages 260.

Subsequent to determining the potential cost of returning or redirecting the near-proximity package 260, the package is offered to the potentially-interested customer at a discounted price, where the discounted price depends on the determined potential cost of return or redirection (block 706). For example, rather than incur the potential cost of returning or redirecting a package 260 without a sale, some or all of the potential cost may be offered as a discount to a potentially interested customer, such as via e-commerce portal 290a, as an inducement to convert the potential interest into an order. In some instances, the package 260 may be delivered to a potentially-interested customer as a gift rather than incurring the cost of returning or redirecting the package 260. For example, if a given customer is particularly valued (e.g., according to past ordering history, appealing demographic profile, etc.), delivering the package 260 to the given customer as a promotional gift may be used to build goodwill.

Use of a shipping model, in various embodiments as described above, may allow for increased predictability and flexibility of control of speculatively shipped packages already in transit, for example by selectively offering packages in transit to a customer depending on the proximity of those packages to the customer, or based on a customer's potential interest in items included in those packages. As just described, a customer's potential interest in a package may be used to attempt to deliver a package already in transit to a specific destination geographical area. However, in some embodiments, the likelihood of a speculatively shipped package successfully being delivered to a delivery address with minimal redirection or return activity may be increased by accurately forecasting customer demand for various items before those items are speculatively shipped, and then speculatively shipping packages to geographical areas dependent on the forecasted demand. That is, while gauging customer interest in an already-speculatively-shipped package and attempting to create further interest (e.g., by discounting) may be useful in precipitating a customer order for that package, delivery results may be improved still further by speculatively shipping packages to geographical areas in which customers are likely to be interested in those packages. In some embodiments, numerous other factors in addition to or other than forecasted customer demand may be taken into account when ascertaining what packages to speculatively ship to which locations, as described below.

In the embodiment illustrated in FIG. 5, fulfillment computer system 210 is shown hosting forecasting model 420 in addition to shipping model 410. Forecasting model 420 may generally be configured to provide decision support for speculative shipping of items. Specifically, in one embodiment, forecasting model 420 may be configured to forecast or predict customer demand for a given item. Forecasting model 420 may be configured to predict aggregate demand for items as well as demand within particular geographical areas. In many respects, forecasting demand for items not yet shipped may rely on data similar to that used to gauge potential customer interest in items already shipped, as described above with respect to FIG. 7. In one embodiment, for example, order center 270 may be configured to collect information about items a particular customer has bought or otherwise expressed interest in. Such information may include a variety of details collected via e-commerce portal 290a, such as the specific web pages viewed and duration of views, overall length of a customer's visit to e-commerce portal 290a, links hovered over and duration of hovering, shopping cart or wish list activity (e.g., whether items were placed in a shopping cart or a wish list without resulting in an immediate order). Such information may also include shopping information received through channels other than e-commerce portal 290a, such as customer telephone inquiries, salesperson contact, responses to marketing materials, etc., which may be supplied through physical storefront 290b or through other means, such as a back-room computer system used by a marketing or sales department.

In one embodiment, data concerning historical customer shopping behavior, which may be collected by order center 270 or elsewhere within the enterprise, may be stored by data warehouse 220 for analysis by forecasting model 420. For example, individual customer purchasing history, e-commerce portal session data such as described above, customer demographic data and/or other relevant individual customer data may be conveyed via network 230 to data warehouse 220 for storage. In some embodiments, forecasting model 420 may be configured to analyze such data in the aggregate to determine potential demand for items. For example, forecasting model 420 may be configured to analyze customer shopping data for customers in a particular geographical area in order to determine typical demand for items that may be speculatively shipped to that particular geographical area.

Demand may be predicted in various ways. For example, if a given customer has purchased a given item, other customers with similar historical shopping patterns (e.g., having purchased or browsed items similar to those of the given customer) may be more likely to purchase the given item, and in some embodiments forecasting model 420 may be configured to detect such possible correlations. However, in instances such as new product releases, there may exist no historical buying activity of an item to use as a basis for comparing actual buyer's characteristics to those of potential buyers. In such cases, forecasting model 420 may be configured in some embodiments to forecast demand for a new product based on its similarity or relatedness to previous products. For example, a newly released novel in a series may reasonably be predicted to have a similar demand profile to the last novel in the series. It is noted that while in some embodiments, product demand may be forecasted across a wide range of products down to a granularity of an individual customer, in other embodiments, forecasting model 420 may be configured to forecast demand of only relatively high-volume products, and may confine its forecasts to broad geographical areas such as the areas serviced by hubs 120, for example. In some embodiments, algorithms used to predict demand for items may be similar to or interoperable with algorithms for general inventory management.

In some embodiments, forecasting customer demand for an item may provide a reasonable first-order heuristic for determining whether and where to speculatively ship that item. However, as mentioned above, in some embodiments numerous other variables may be taken into account by forecasting model 420. For example, in one embodiment, forecasting model 420 may include feedback indicative of the current state of a given common carrier's shipping network as an input. That is, in determining whether new speculative shipments of packages should occur, forecasting model 420 may take into account those items currently in speculatively shipped packages 260 distributed throughout a carrier's network and/or the current location of such speculatively shipped packages. If numerous units of an item are speculatively in transit, for example, forecasting model 420 may negatively bias a decision to speculatively ship packages including additional units of that item. In contrast, upon detecting item scarcity within the shipping network, forecasting model 420 may indicate additional speculative shipments are warranted. Such decisions may also be modified by other parameters and inputs, such as rates of successfully matching speculatively shipped packages 260 with customer orders (e.g., preventing a package 260 from being returned), rates of new customer orders, etc.

Various types of product-specific variables, such as item cost, margin, volume, availability and other such factors may also be taken into account in speculative shipment decision analysis by forecasting model 420. Collectively, all variables available as inputs to forecasting model 420 (whether financial, logistical, operational or other types of variables) may be referred to as business variables, and forecasting model 420 may be configured to analyze, predict or forecast future values of some such variables in terms of the present values of various variables. For example, the risk of speculative shipment of a package 260 including a given item (e.g., the risk that a speculatively shipped item will incur return or redirection costs) may vary depending on the current cost and/or margin of the item. In cases where risk tolerance is higher (e.g., for items with higher margins), forecasting model 420 may advise speculative shipment in the absence of other corroborating evidence, such as historical customer data. Where risk tolerance is lower, forecasting model 420 may attempt to make a more refined prediction of success, such as by taking other variables into account. Similarly, risk tolerance for speculative shipment of packages 260 including various items may vary dependent upon volume and availability of those items. For example, forecasting model 420 may generally indicate against speculative shipment of low-volume items or items for which availability from suppliers is scarce.

In some embodiments, the cost and risk factors weighed by forecasting model 420 may be complex and dynamic over time. For example, as described above, in some embodiments packages 260 may leave fulfillment center 110 on a privately contracted carrier vehicle to be directly tendered at one or more hubs 120. In some such embodiments, a vehicle may have free space for packages remaining after being loaded with non-speculative packages 260 and those packages 260 for which forecasting model 420 has initially advised speculative shipment. In this scenario, the incremental cost of transporting additional packages 260 to those stops planned for the vehicle may be quite small, for example if the vehicle cost is fixed regardless of usage. In view of such situational costs, forecasting model 420 may determine that packages 260 not previously considered for speculative shipment (e.g., due to poor balance of risks when accounting for fully-burdened shipping costs) may present a more acceptable risk profile, and advise that such packages 260 be added to the partially-loaded vehicle for speculative shipment.

It is contemplated that forecasting model 420 may take into account numerous other types of dynamic variables. For example, forecasting model 420 may be more or less continuously gathering logistical, financial and other information and responsively updating indications of what packages 260 should be speculatively shipped to specific geographical areas. Additionally, it is contemplated that in some embodiments, forecasting model 420 may take similar variables into account for packages 260 that have already been speculatively shipped and are current in transit. For example, forecasting model 420 may be configured to monitor previously speculatively shipped packages 260 to determine whether those packages should be redirected to different geographical areas, based on any of the factors described above as well as time in transit, distance to the originally-specified destination geographical area, etc. As an alternative to redirection, forecasting model 420 may be configured to determine whether to offer cost incentives to potential customers, such as discounts or promotions, to increase the likelihood of a sale. Such a determination may take into account cost and product variables similar to those described previously.

Figure 8:
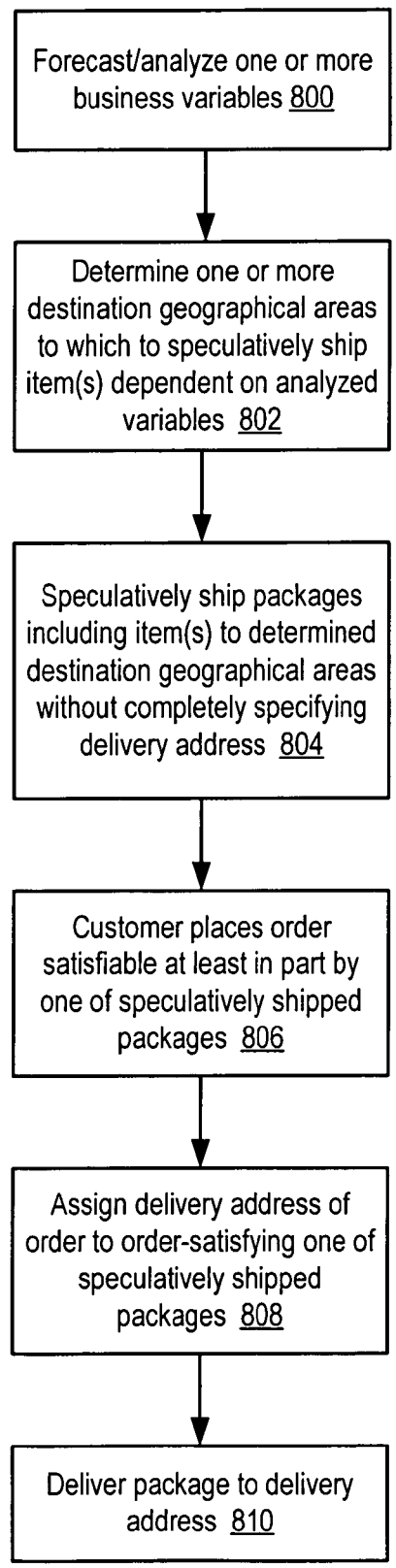
FIG. 8 is a flow diagram illustrating one embodiment of a method of employing business variable analysis in conjunction with speculative shipping.

One embodiment of a method of employing dynamic modeling and forecasting of business variables in conjunction with speculative shipping is illustrated in FIG. 8. Referring collectively to FIGS. 1-8, operation begins in block 800 where one or more business variables, such as customer demand for one or more items, for example, are forecast or analyzed. As described above, in some embodiments forecasting may be performed by forecasting model 420, which may be configured to analyze warehoused data to detect and predict purchasing trends, analyze the current state of previously speculatively shipped packages within a common carrier's network, perform cost/risk sensitivity analyses, etc. In some embodiments, forecasting may use models driven by data sources external to an enterprise, such as models of general market or cultural trends, competitors' behavior, etc.

Subsequent to forecasting of business variables, one or more destination geographical areas to which to speculatively ship the items are determined dependent upon the analyzed variables (block 802). For example, forecasting model 420 may aggregate its predictions by geographical area, and those geographical areas with the highest forecasted demand may be determined as likely candidates for speculative shipments. As noted previously, in some embodiments customer demand may be modulated by other variables such as item cost, margin, volume, etc. in determining what destination geographical areas to which to speculatively ship an item, or whether to speculatively ship the item at all.

Prior to a customer placing an order corresponding to a speculatively shipped package, each of a number of packages 260 including the one or more items is then speculatively shipped to a corresponding destination geographical area without completely specifying a corresponding delivery address at time of shipment (block 804). In some embodiments, the specific number of packages 260 speculatively shipped to a particular destination geographical area may be determined by forecasting model 420 dependent upon forecasted customer demand and/or other variables.

While one or more of speculatively shipped packages 260 are in transit, a customer places an order with a corresponding delivery address, where the order is satisfiable at least in part by one of packages 260 (block 806). In response to the order, the corresponding delivery address is assigned to the package 260 that satisfies the order (block 808) and the package 260 is delivered to the delivery address (block 810). For example, in some embodiments the delivery address may be assigned as described above in conjunction with the description of FIG. 3.

Figure 9:
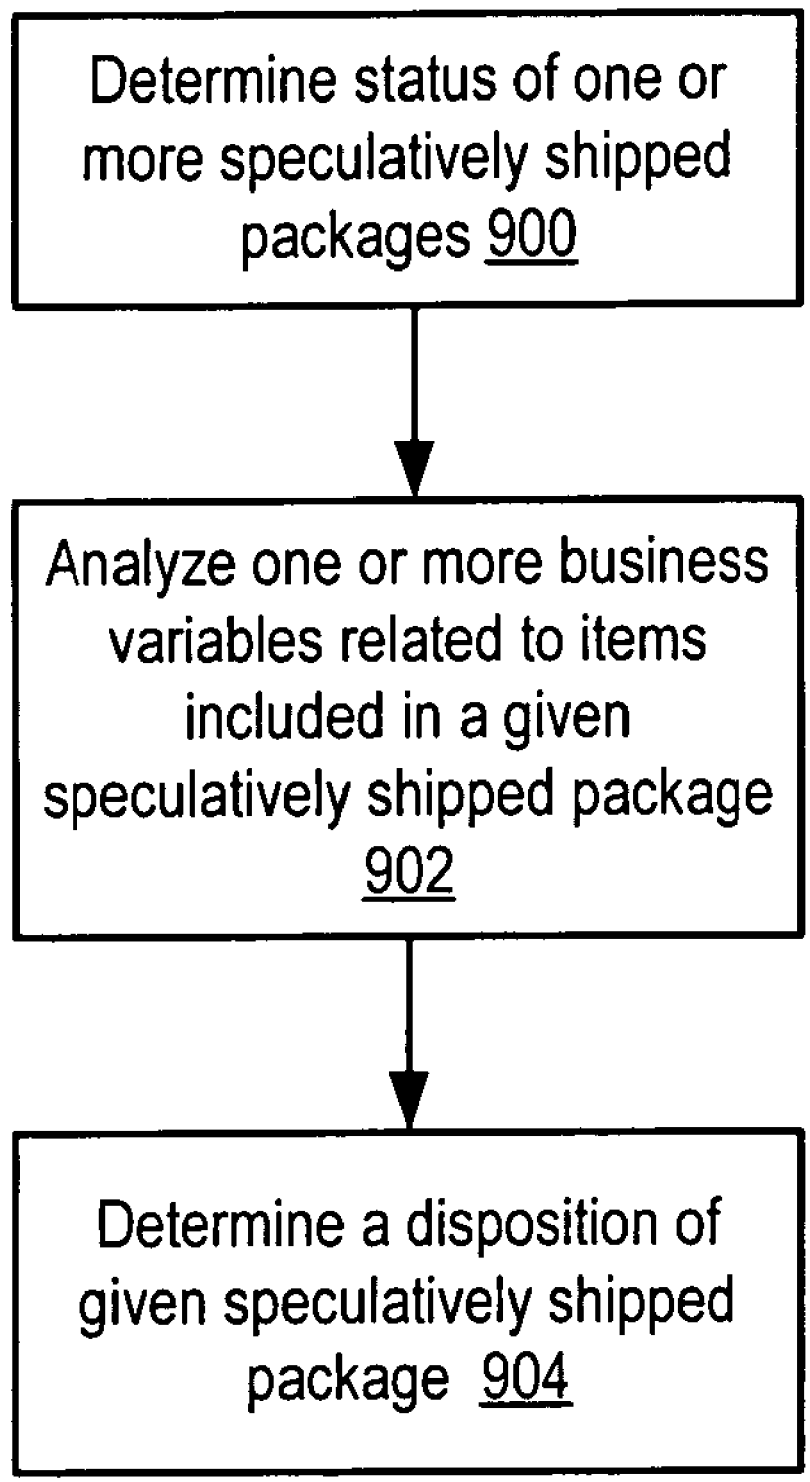
FIG. 9 is a flow diagram illustrating one embodiment of a method of performing business variable analysis on previously speculatively shipped packages currently in transit.

As noted above, in some embodiments dynamic modeling and forecasting of business variables may also be performed with respect to speculatively shipped packages 260 already in transit, for example to determine the disposition of such packages. One embodiment of such a method is illustrated in FIG. 9. Referring collectively to FIGS. 1-9, operation begins in block 900 where the status of one or more speculatively shipped packages 260 currently in transit to respective destination geographical areas is determined. For example, determining the status of such a package 260 may include ascertaining the location of the package 260, such as by consulting carrier package tracking data. Status determination may also include determining the items included in a package 260, for example by consulting a manifest record associated with the package 260. Any other information pertinent to a particular package 260, such as a predicted path or latency according to a shipping model, may be included in the status determination.

Subsequent to determining status for a given speculatively shipped package 260, one or more business variables related to items included in the given package 260 are analyzed (block 902). As described in detail above, such analysis in various embodiments may take into account predicted or actual customer demand, financial variables such as item and transportation costs and margins, risk analysis as to whether the given package 260 may incur return or redirection costs, or any other suitable analysis.

Dependent upon the business variable analysis, a disposition of the given speculatively shipped package 260 is determined (block 904). In various embodiments, a package disposition may include allowing the given package 260 to continue along its current path towards its current destination geographical area. Alternatively, a package disposition may include returning the given package 260 to a fulfillment center, redirecting it to another destination geographical area, or determining to offer a purchase incentive to a potential customer, for example to encourage a sale rather than an alternative disposition.

In some embodiments, a shipping model such as shipping model 410 may be used in conjunction with forecasting model 420 to manage the logistics of speculative shipping of packages to selected geographical areas, particularly with respect to timing package availability. For example, in some instances an enterprise may desire that a newly released item be widely available for delivery on that item's official release date. As described above, in some embodiments shipping model 410 may be configured to predict latency and routing information for a given package 260 from any point in a common carrier's network, including the point of package tendering (e.g., at fulfillment center 110 or at a hub 120). Forecasting model 420 may be configured to predict demand, risk and/or speculative shipping cost for the new release item in various geographical areas (e.g., based on item preorders), while shipping model 410 may be used to determine how far in advance of the item's release date to speculatively ship packages 260 including the item for timely delivery on the release date.

It is contemplated that in some embodiments, speculative shipping and late-select addressing of packages, used individually or in combination with modeling of shipping behavior and/or modeling and analysis of related business variables, may effectively allow inventory items to be speculatively extended towards customers through a shipping network. That is, under a speculative shipping model, the scope of items that are available to a given customer is extended to include items already within a shipping network, in addition to items actually stored in inventory at various fulfillment centers 110. However, it is noted that speculatively shipped packages 260 within a common carrier's shipping network may not be managed themselves as inventory by the common carrier. That is, a package 260 in transit may not be subject to being stored for arbitrary periods of time without a corresponding destination or customer order before being picked for shipment, as may be the case for inventory items within fulfillment center 110, for example. Rather, a package 260 may be packaged for ultimate delivery to a delivery address prior to tendering to a common carrier, and then may be more or less continually in transit to a given geographical area or delivery address after being tendered to a common carrier for speculative shipment. Once tendered to a common carrier, a package 260 may be managed by the common carrier's shipping flow. Aside from late-select addressing, which may not be necessary for non-speculatively shipped packages, a speculatively shipped package 260 may be managed within the common carrier's shipping network in a manner indistinguishable from other packages.

It is further contemplated that in some embodiments, speculative shipping, shipping behavior modeling and business variable analysis may be extended to various enterprise partners, particularly e-commerce partners, depending on the degree of relationship of the partner to the enterprise. For example, in one embodiment, a web-based retailer may manage e-commerce portal 290*a* for presenting its own offerings to customers, but may also host a web-based presence for a partner merchant, for example as a distinct e-commerce portal 290*a*, or as a particular storefront on an existing e-commerce portal 290*a*. In some instances, a particular partner merchant may maintain its own fulfillment centers distinct from fulfillment center 110, such that once a customer order is placed via e-commerce portal 290*a*, the partner merchant may handle all aspects of picking, packaging and shipping the order. In one such embodiment, the partner merchant may be provided with access to shipping model 410 and/or forecasting model 420 (e.g., via web services) in order to implement and manage its own speculative shipping and/or inventory management strategies. In an alternative embodiment, a partner merchant may be configured to use order fulfillment services provided by fulfillment center 110, for example by providing inventory to be located at or near fulfillment center 110.

In yet another embodiment, a partner merchant may be configured to use the speculative shipping management services provided by fulfillment center 110, such as late-select addressing, while tendering its own inventory to a common carrier. For example, in one such embodiment, a partner merchant may package its own merchandise for speculative shipment and may assign unique identifiers and destination geographical areas to its packages as instructed by fulfillment computer system 210. The partner merchant may then tender its packages to a common carrier at a hub 210 or at another convenient point, such as a drop box, for example. In such an embodiment, the partner merchant's packages may be managed by fulfillment computer system 210 as though they had originated from fulfillment center 110, although in some cases they may have originated from some other point. For example, a small merchant such as an individual entrepreneur with access to a common carrier's shipping network may use the various shipping services presented by fulfillment computer system 210 as described above, even though the small merchant may be hundreds of miles away from the nearest fulfillment center 110.

As described above, in some embodiments, speculative shipping of packages 260 may enable more sophisticated and timely management of inventory items, for example by allowing packages 260 to begin flowing towards potential customers in advance of actual orders. It is noted that in some embodiments, speculative package shipping may also enable more optimal utilization of resources of fulfillment center 110. For example, in some cases, order volume and consequent packing and shipping activity within fulfillment center 110 may vary at different times of day, days of the week, etc. which may result in backlogs at some times while fulfillment center 110 is relatively idle at other times. By speculatively shipping certain items in advance of orders, for example during off-peak periods of activity, it becomes more likely that some orders received during times of peak activity for fulfillment center 110 may be satisfiable by packages 260 already speculatively in transit. Consequently, resource utilization within fulfillment center 110 (e.g., employees, machinery, etc.) may be more even over time, which may increase overall efficiency of fulfillment center 110.

Speculative Shipping Data Flow

Figure 10:
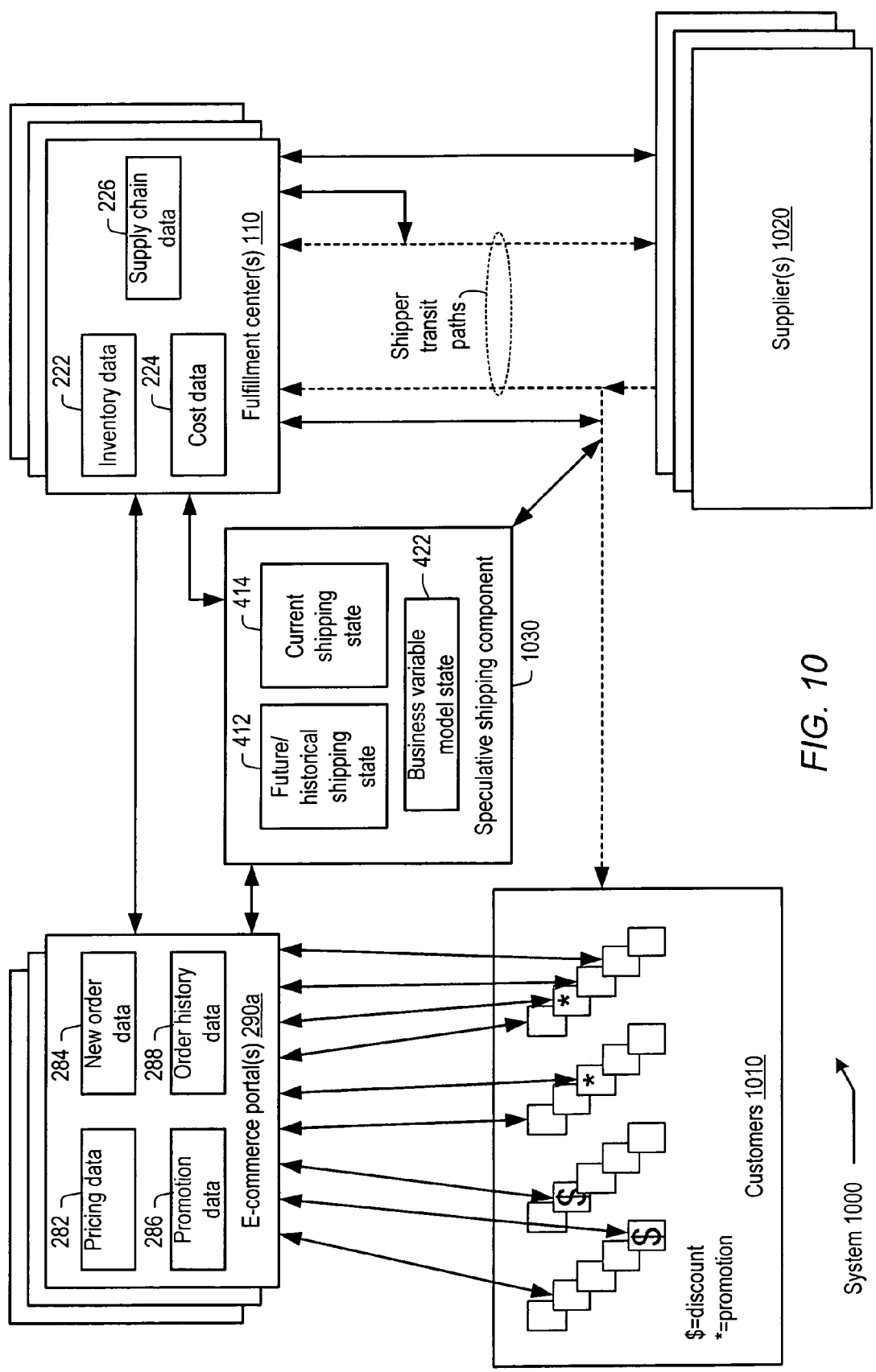
FIG. 10 is a data/communication flow diagram illustrating data/communication flow relationships in one embodiment of a fulfillment system configured to support speculative shipping.

Numerous distinct data/communication flow relationships may exist between various entities and system components in the embodiments described above. The data/communication flow relationships in one embodiment of a fulfillment system configured to support speculative shipping are illustrated in FIG. 10. It is noted that data/communication flow relationships may illustrate abstract relationships between different producers and consumers of data, and may not coincide with the physical relationships among tangible elements of a system.

In the illustrated embodiment, system 1000 includes one or more fulfillment centers 110 as well as one or more e-commerce portals 290*a*, each of which may be illustrative of corresponding elements described above. System 1000 further includes a number of customers 1010, one or more suppliers 1020, and speculative shipping data 1030. Various data relationships among elements of system 1000 are illustrated and described in detail below. Additionally, in the illustrated embodiment, physical shipment paths exist between supplier(s) 1020 and fulfillment center(s) 110 as well as between fulfillment center(s) 110 and customers 1010. These shipper transit paths are shown as distinct from the data relationships within system 1000. In some instances, fulfillment center(s) 110 may request a supplier 1020 to drop ship an item to a customer 1010, e.g., to directly ship a package to a customer without that package originating from fulfillment center(s) 110. In some embodiments, fulfillment center(s) 110 may also request a supplier 1020 to speculatively ship a package 260 in a manner similar to that in which a package 260 may be speculatively shipped from a fulfillment center 110, as described above.

Different types of data may be hosted, processed or conveyed by different entities within system 1000. For example, in the illustrated embodiment, fulfillment center(s) 110 may be configured to host inventory data and cost data pertaining to items held as inventory within fulfillment center(s) 110, as well as supply chain data relevant to managing items in transit between supplier(s) 1020 and fulfillment center(s) 110. E-commerce portal(s) 290a may host item pricing and promotion data as well as data relating to new and historical customer orders received via the portal. Additionally, speculative shipping data 1030 may include additional data that may be hosted by fulfillment center(s) 110, e-commerce portal(s) 290a, or another suitable host or hosts within system 1000. Such data may include current state information regarding items in transit from fulfillment center(s) 110 to customers 1010 (whether speculatively shipped or not), historical and future shipping state information (e.g., planned shipments not yet executed), and state information relating to business variable modeling such as described above. It is noted that in some embodiments, speculative shipping data 1030 may be included within other entities such as shipping model 410 and/or forecasting model 420, which may in turn be hosted by one or more specific computer systems such as fulfillment computer system 210, for example.

Relationships among the various types of data and systems within system 1000 are illustrated using solid arrows. For example, individual ones of customers 1010 may interact with e-commerce portal(s) 290a, such as through a web page presented to a customer 1010. Specifically, customers 1010 may exchange data with e-commerce portal(s) 290a to browse items, place orders for items, check the status of outstanding orders, etc. Additionally, in some embodiments, e-commerce portal(s) 290a may be configured to present discount offers or other promotions to various customers 1010. For example, a previously speculatively shipped package 260 may be offered to one of customers 1010 at a discount as described above. In the illustrated embodiment, data hosted by e-commerce portal(s) 290a may interact with speculative shipping data 1030 as well as data hosted by fulfillment center(s) 110. For example, an e-commerce portal 290a may query speculative shipping data 1030 to determine whether an item of potential interest to a customer has previously been speculatively shipped. In such an example, such shipping data may be used in conjunction with business variable modeling as well as cost data hosted by fulfillment center(s) 110 to determine whether to discount an item.

As described previously, fulfillment center(s) 110 may interact with speculative shipping data 1030, for example to monitor the state of speculatively shipped packages 260 in transit and to determine whether to speculatively ship additional packages. Both speculative shipping data 1030 and fulfillment center(s) 110 may be configured to interact with one or more shippers (e.g., common carriers such as described above), for example to retrieve tracking data corresponding to packages 260 in transit.

In the illustrated embodiment, fulfillment center(s) 110 may conventionally ship various packages 260 to customer 1010, and may speculatively ship packages 260 to various geographical areas as described above. Fulfillment center(s) 110 may also receive inventory from (and in some cases, return inventory to) various supplier(s) 1020. As illustrated in FIG. 10, fulfillment center(s) 110 may maintain a data relationship with supplier(s) 1020, for example to place and monitor orders for inventory. Fulfillment center(s) 110 may also be configured to monitor items in transit between supplier(s) 1020 and fulfillment center(s) 110, whether those items are conveyed via common or private carriers.

Numerous other arrangements of and relationships among data within system 1000 are possible and contemplated. It is noted that in one embodiment, speculative shipment of a given package 260 may include exercising one or several of different data relationships within system 1000, including invoking the interaction of multiple different data systems that may be physically collocated or distributed.

Exemplary Computer System Embodiment

Figure 11:
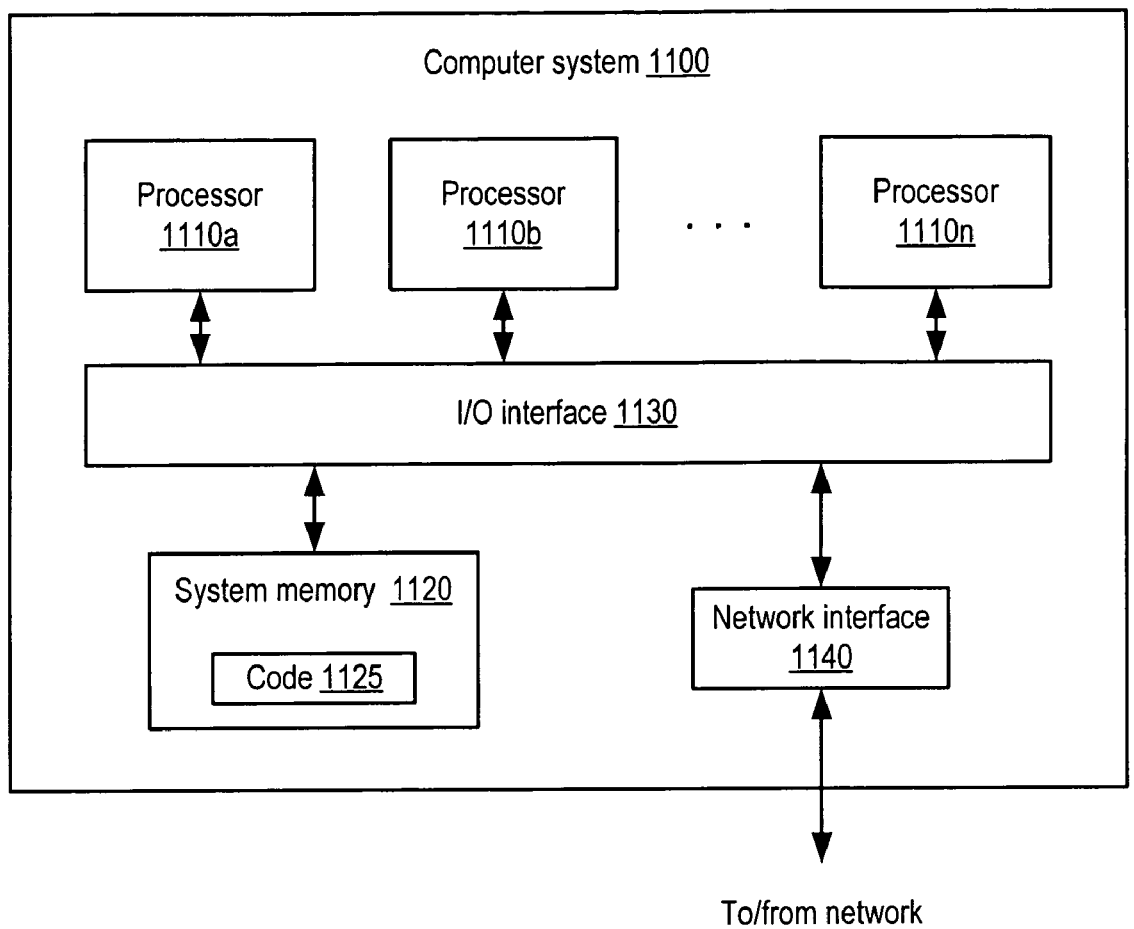
FIG. 11 is a block diagram illustrating an exemplary embodiment of a computer system.

It is contemplated that in some embodiments, any of the methods or techniques described above may be implemented as program instructions and data capable of being stored or conveyed via a computer-accessible medium. Such methods or techniques may include, for example and without limitation, the functions of data warehouse 220, order database 280, shipping model 410, forecasting model 420, or the methods or data relationships illustrated in FIGS. 3, 4 and 6-10 as may be implemented by or performed in whole or part by fulfillment computer system 210 and/or shipping hub computer system 240. Such program instructions may be executed to perform a particular computational function, such as data warehousing and virtualization, storage management, query and data set analysis, query evaluation, operating system functionality, applications, and/or any other suitable functions. One exemplary embodiment of a computer system including computer-accessible media, as illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

As noted above, in various embodiments computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by process 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1120 as code 1125.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems, for example. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD-ROM coupled to computer system 1100 via I/O interface 1130. A computer-accessible medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   an enterprise packaging one or more items as a package for eventual shipment to a delivery address;
   said enterprise selecting, by one or more computers, a destination geographical area to which to ship said package, wherein said destination geographical area includes multiple delivery addresses to which said package is deliverable;
   said enterprise shipping said package to said destination geographical area via a carrier that is distinct from said enterprise, wherein said shipping includes specifying said destination geographical area but purposefully not completely specifying any delivery address at time of shipment, such that at time of shipment, said package is deliverable to said destination geographical area but is intentionally not deliverable to any delivery address, and wherein said shipping comprises said enterprise physically tendering said package to said carrier; and
   after said shipping has commenced and after said package has left a location at which said one or more items were packaged, and while said package is in transit, said enterprise completely specifying, via one or more computers, said delivery address for said package to said carrier, such that as a result of said enterprise completely specifying said delivery address to said carrier, said package becomes deliverable to said delivery address by said carrier.

2. The method as recited in claim 1, wherein said enterprise completely specifying said delivery address for said package comprises said enterprise instructing an entity at a location in between an origin of said package and said delivery address to apply a label to said package indicating said delivery address.

3. The method as recited in claim 1, wherein said enterprise shipping said package to said destination geographical area comprises said enterprise tendering said package to a common carrier from a fulfillment center.

4. The method as recited in claim 1, wherein said enterprise shipping said package to said destination geographical area comprises said enterprise transporting said package from a fulfillment center to a shipping hub of a common carrier and tendering said package to said common carrier at said shipping hub.

5. The method as recited in claim 4, wherein said delivery address for said package is completely specified prior to said enterprise tendering said package to said common carrier at said shipping hub.

6. The method as recited in claim 1, wherein said enterprise selecting said destination geographical area comprises said enterprise specifying at least a portion of a postal code, wherein said at least a portion of said postal code corresponds to said destination geographical area.

7. The method as recited in claim 6, wherein said at least a portion of said postal code comprises three most significant digits of a United States Postal Service ZIP code.

8. The method as recited in claim 1, further comprising said enterprise redirecting said package to a different destination geographical area while said package is in transit.

9. The method as recited in claim 1, wherein said enterprise shipping said package occurs before a customer places an order for said one or more items to be delivered to said delivery address.

10. The method as recited in claim 9, further comprising said enterprise predicting overall customer demand for said one or more items within said destination geographical area, wherein said enterprise selecting said destination geographical area is dependent upon said predicting.

11. The method as recited in claim 10, wherein said enterprise predicting overall customer demand comprises said enterprise analyzing historical customer shopping patterns.

12. The method as recited in claim 1, wherein said enterprise selecting said geographical area to which to ship said package is dependent upon said enterprise analyzing one or more business variables related to said one or more items.

13. The method as recited in claim 12, wherein said enterprise analyzing said one or more business variables comprises said enterprise determining the status of previously shipped packages.

14. The method as recited in claim 12, wherein said enterprise analyzing said one or more business variables comprises said enterprise determining a cost associated with said one or more items.

15. The method as recited in claim 12, wherein said enterprise analyzing said one or more business variables comprises said enterprise determining a risk of a shipped package incurring return or redirection costs.

16. The method as recited in claim 1, further comprising:
said enterprise gathering historical shipment tracking data from a common carrier for a plurality of packages in transit;
said enterprise generating a predictive shipping model for said common carrier using said historical shipment tracking data, wherein said predictive shipping model is configured to predict a latency to a delivery address for a given package; and
said enterprise using said predictive shipping model, identifying proximity of said shipped package to a particular delivery address.

17. The method as recited in claim 1, further comprising:
said enterprise selecting a respective destination geographical area to which to ship each of a plurality of packages;
said enterprise shipping each of said plurality of packages to a respective destination geographical area without completely specifying any corresponding delivery address at time of shipment; and
while a given one of said plurality of packages is in transit, said enterprise completely specifying said corresponding delivery address for said given package.

18. The method as recited in claim 1, wherein said enterprise shipping said package to said destination geographical area without completely specifying any delivery address at time of shipment further comprises said enterprise shipping said package without specifying an addressee of said package.

19. The method as recited in claim 18, further comprising said enterprise specifying at least a portion of a physical address corresponding to said package at time of shipment.

20. The method as recited in claim 1, wherein said enterprise shipping said package to said destination geographical area without completely specifying any delivery address at time of shipment further comprises said enterprise shipping said package to an addressee without completely specifying a physical address of said package.

* * * * *